United States Patent [19]

Duren et al.

[11] Patent Number: 5,182,729

[45] Date of Patent: Jan. 26, 1993

[54] REDUCTION OF SIDESWIPE NOISE FROM SEISMIC DATA BY NULL STEERING

[75] Inventors: Richard E. Duren, Spring; Stanley V. Morris, Deer Park, both of Tex.

[73] Assignee: Exxon Production Research Company, Houston, Tex.

[21] Appl. No.: 753,743

[22] Filed: Sep. 3, 1991

[51] Int. Cl.$^5$ .......................... G01V 1/36; G01V 1/28
[52] U.S. Cl. ........................................ 367/38; 367/21; 367/59; 367/43
[58] Field of Search ...................... 367/20, 21, 24, 38, 367/43, 53, 56, 58, 59, 61

[56] References Cited

U.S. PATENT DOCUMENTS

| | | | |
|---|---|---|---|
| 3,299,397 | 1/1967 | Pavey et al. | 367/24 |
| 3,550,073 | 12/1970 | Foster et al. | 367/53 |
| 3,858,168 | 12/1974 | Barr et al. | 367/43 |
| 4,034,333 | 7/1977 | Cunningham | 367/46 |
| 4,380,059 | 4/1983 | Ruehle | 367/46 |
| 4,437,175 | 3/1984 | Berni | 367/24 |
| 4,468,761 | 8/1984 | Rietsch | 367/43 |
| 4,486,865 | 12/1984 | Ruehle | 367/24 |
| 4,740,929 | 4/1988 | Ehlers et al. | 367/46 |
| 4,758,998 | 7/1988 | Johnson et al. | 367/58 |
| 4,853,902 | 8/1989 | Corrigan | 367/44 |
| 4,853,903 | 8/1989 | Linville et al. | 367/46 |
| 4,910,716 | 3/1990 | Kirlin et al. | 367/24 |
| 4,992,995 | 2/1991 | Favret | 367/43 |

FOREIGN PATENT DOCUMENTS 1256193 6/1989 Canada .

OTHER PUBLICATIONS

Bresler, Y., Reddy, V. U., & Kailath, T., *Optimum Beamforming for Coherent Signal and Interferences*, IEEE Transactions on Acoustics, Speech, and Signal Processing, vol. 36, No. 6 (Jun. 1988), pp. 833-843.

Luthra, A. K., *A Solution to the Adaptive Nulling Problem with a Look-Direction Constraint in the Presence of Coherent Jammers*, IEEE Transactions on Antennas and Propagation, vol. AP-34, No. 5 (May 1986), pp. 702-710.

Rissanen, J., *Modeling by Shortest Data Description*.

Shan, t., & Kalilath, T., *Adaptive Beamforming for Coherent Signals and Interference*, IEEE transactions on Acoustics, Speech, and Signal Processing, vol. AS-SP-33, No. 3 (Jun. 1985), pp. 527-536.

Wax, M. & Ziskind, I., *Detection of the Number of Coherent Signals by the MLD Principle*, IEEE Transactions on Acoustics, Speech, and Signal Processing, vol. 37, No. 8, (Aug. 1989), pp. 1190-1196.

Widrow, B., Duvall, K. M., Gooch, R. P. & Newman, W. C., *Signal Cancellation Phenomena in Adaptive Antennas: Causes and Cures IEEE Transactions on Antennas and Propagation*, vol. AP-30, No. 30 (May 1982), pp. 469-478.

Ziskind, I. & Wax, M., *Maximum Likelihood Localization of Multiple Sources by Alternating Projection*, IEEE Transactions on Acoustics Speech, & Signal Processing, vol. 36, No. 10 (Oct. 1988), pp. 1553-1560.

Primary Examiner—Ian J. Lobo
Attorney, Agent, or Firm—Pravel, Gambrell, Hewitt, Kimball and Krieger

[57] ABSTRACT

Disclosed is a seismic surveying and data processing method to filter from seismic data any energy contributions that are not in the seismic line of profile. The surveying method requires a receiver geometry wherein at least one receiver is in and at least one receiver is out of the line of profile, so that in common offset gather or shot record plots, seismic events along the line of profile are aligned in time and out-of-plane energy takes the form of a series of sawtoothed seismic events arriving at different times in the different lines of receivers. Knowing the number of out-of-plane energies and their respective dips allows for the design of a filter, which is applied to the data with a computer, to null and thereby remove the effects of unwanted out-of-plane energy from the seismic survey data.

11 Claims, 30 Drawing Sheets

REDUCTION OF SIDESWIPE NOISE FROM SEISMIC DATA BY NULL STEERING

BACKGROUND OF THE INVENTION

1. Field of the Invention

This invention relates to seismic data acquisition and to methods of processing seismic data. In another aspect, this invention relates to a process for the filtering of sideswipe noise or interference from seismic data. In still another aspect, this invention relates to a process for determining the number of interfering noises, and their respective directions or dips of arrival.

2. Description of the Prior Art

Seismic exploration involves generating seismic pulses at the surface of the earth by means of one or more seismic sources. The seismic pulses travel downwardly into the earth with a fractional amount being reflected and/or refracted due to differences in elastic properties at the interface of various subterranean formations. Detectors, such as seismometers, geophones or hydrophones, produce analog electrical seismic signals or seismic trace signals in response to detected seismic wave reflections and/or refractions. The analog electric seismic signals or seismic trace signals from the detectors can then be recorded. Alternatively, the analog seismic signals or seismic trace signals from the detectors can be sampled and digitized prior to being recorded. The seismic data recorded in either manner are subsequently processed and analyzed to determine the nature and structure of the subterranean formations.

From the recorded data, a seismic section is generated. A seismic section is a seismic image depicting the subsurface layering of a section of earth along a seismic line of profile. It is an important tool which the geologist studies to determine the nature of the earth's subsurface formations. However, before an array of seismic samples can be converted into a seismic section which can be interpreted by the geologist, the seismograms must be processed to reduce the degradation due to noise.

Recorded seismic data always includes some unwanted energy in addition to the desired reflections and/or refractions from the subterranean formations. This unwanted energy can distort or even ruin the seismic data by obscuring or masking seismic events related to the reflections and/or refractions from the subterranean formations. Unwanted energy can also create the appearance of geologic events that are in fact not real. It can be generated in many ways, such as atmospheric electromagnetic disturbance, wind, motor vehicle traffic, boat noise, system generated noise, and reflections from out of plane events.

In the ideal acquisition of two dimensional seismic data, the energy gathered by the receivers would all come from a two dimensional plane which is along the seismic line of profile encompassing the energy source and receivers wherein the two dimensional plane is generally normal to the earth's surface. Unfortunately, many times unwanted out-of-plane energy is gathered by the receivers.

This out-of-plane energy, commonly known as "sideswipe", is frequently encountered in marine seismic data acquisition, and is also known to occur in land based seismic data acquisition.

SUMMARY OF THE INVENTION

According to one embodiment of the present invention, a seismic surveying and data processing method has been developed to filter from seismic data unwanted out-of-plane energy contributions. The present invention is used with seismic survey data obtained in a seismic line of profile by at least two seismic receivers in response to a seismic source. The present method for removing the effects of unwanted out-of-plane energy first involves recording the seismic data collected from a cross-line seismic receiver array. Next, cross-line sorted pre- or post-stack data, for example, common offset gathers or shot records of the collected seismic data are formed in which seismic events along the line of profile are aligned in time. In contrast, out-of-plane events take the form of a series of sawtoothed seismic events arriving at different times in the different lines of receivers. The number of unwanted out-of plane energies is determined by summation of all of the events that have the form of a series of sawtoothed seismic events. The dip or direction of arrival of the unwanted out-of-plane energy is determined by measuring or calculating the dip of one or more of the sawtoothed events. Once the filter design parameters, number of the unwanted out-of-plane energies and their respective dips are determined, a seismic filter can be designed to null those events having the form of a series of sawtoothed seismic events. Finally, the seismic filter is applied by a computer to the seismic data to null those events having the form of a series of sawtoothed seismic events, thereby removing the effects of unwanted out-of-plane energy from the seismic survey data.

DETAILED DESCRIPTION OF THE INVENTION

I. Introduction

Figure 1:
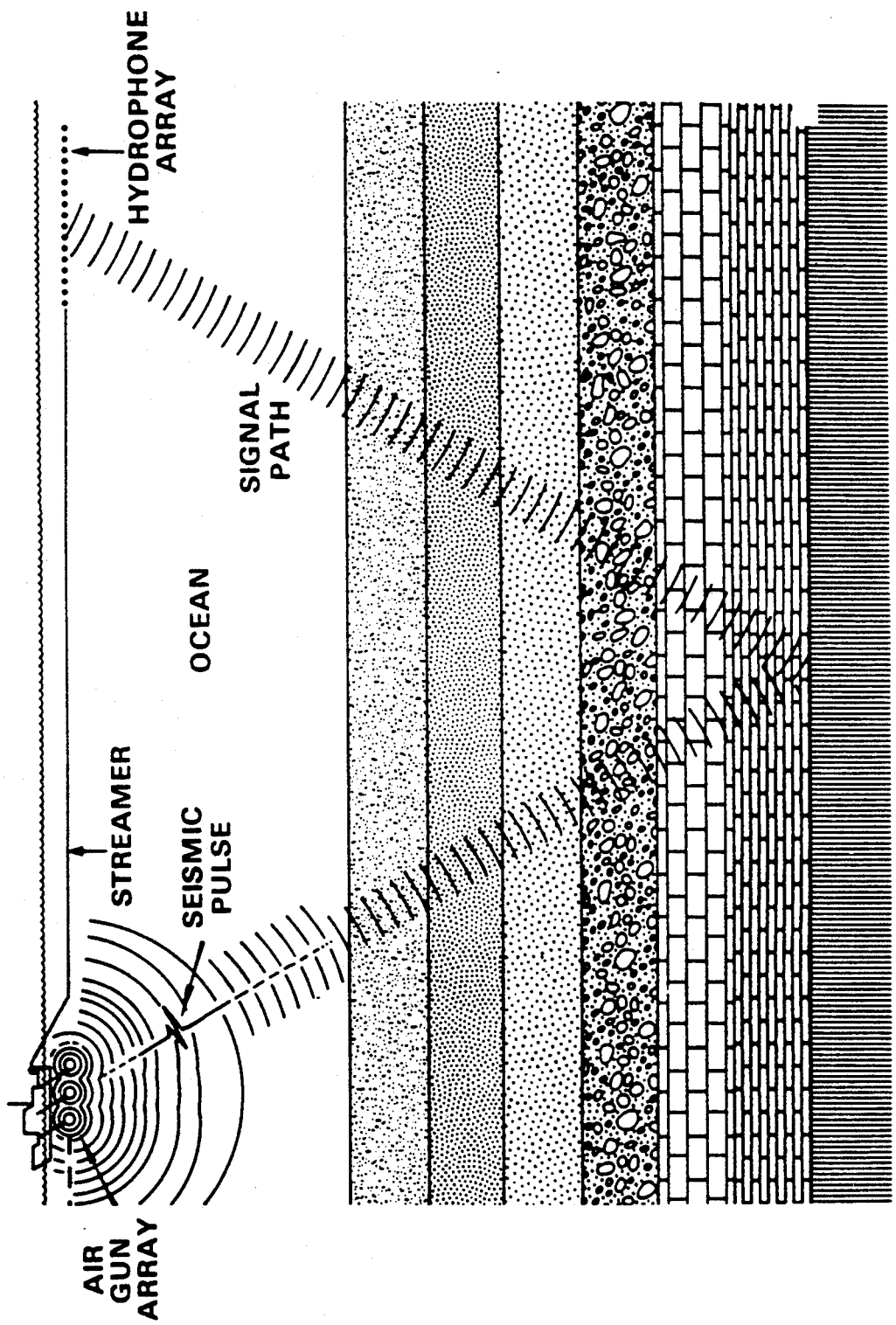
FIG. 1 is a representation of a typical marine seismic data acquisition system.
Figure 3:
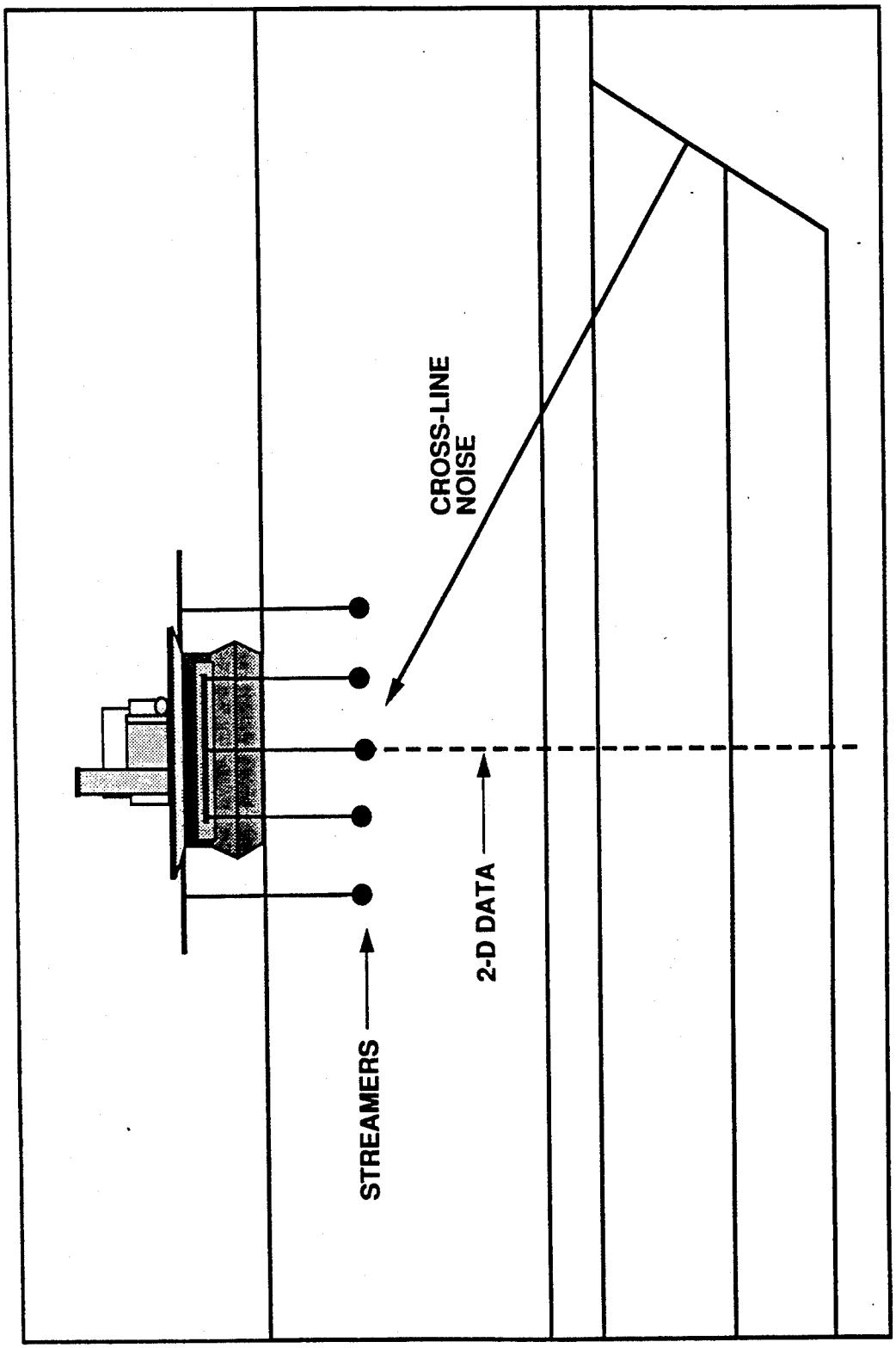
FIG. 3 shows use of multiple streamer geometry in the collecting of marine seismic data.
Figure 4:
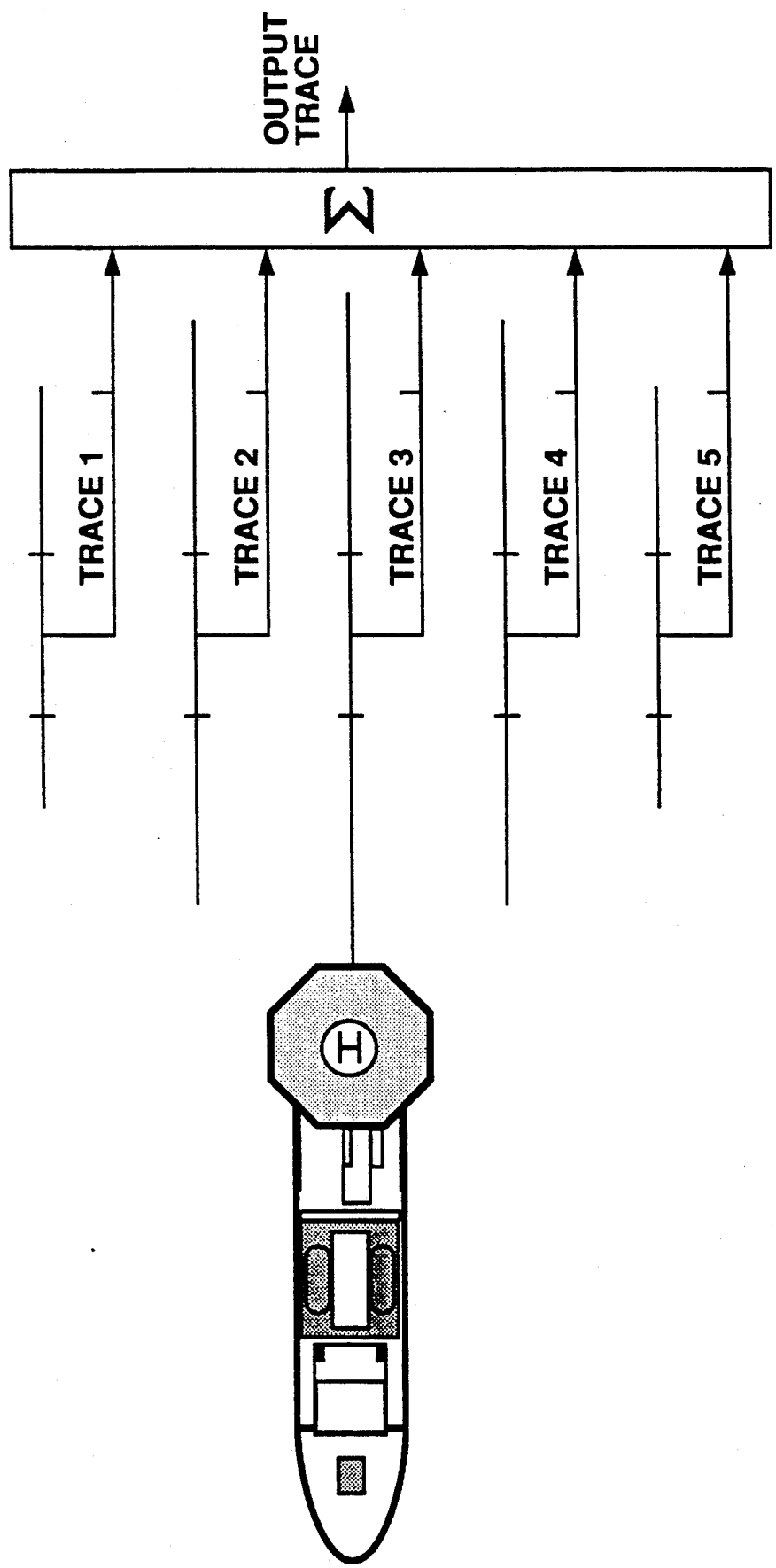
FIG. 4 is a schematic diagram of cross-line array summation in the collecting of marine seismic data.

At the outlet, brief introductory remarks by way of summarization are submitted as an overview to assist in understanding the subject matter of the present invention. Marine seismic exploration is usually conducted by towing a seismic streamer at a given depth through the ocean or other body of water. The streamer is provided with a plurality of pressure sensors, such as hydrophones, disposed at appropriate intervals along the length thereof. Acoustic wave energy is provided in the vicinity of the cable by an air gun or other suitable means; this energy travels downwardly into the earth and some fractional amount is reflected or refracted back up to the hydrophones located on the streamer (see FIG. 1). In those instances where there are unfavorable geologic conditions, it is possible for an out-of-plane reflection that is known as "sideswipe" to occur (see FIG. 2). Although out-of-plane reflections are one of the primary sources of out-of-plane energy or "sideswipe" as related to the present invention, there are others. Examples include other sources providing seismic or other wave energy, such as another survey crew operating in a nearby area, or the like. One technique for reducing this out-of-plane energy is to use multiple streamer geometry and apply a simple cross-line array summation (see FIGS. 3 and 4). However, this technique is not as effective as desired.

In an optimum array processing technique, the sensor outputs from the multiple streamer geometry are combined by a weight vector to yield the desired signal without distortion, while rejecting the interfering out-of-plane sideswipe signals to the maximum extent. However, many of the prior art array processing techniques assume that the interfering signals are uncorrelated with the desired signal. However, sideswipe can exhibit coherence much in the manner of the data of interest. In that case, not only do the traditional optimum adaptive beamformers fail to form nulls in the direction of the coherent interferences, but they also tend to cancel the desired signal in the output.

There are prior art methods which address the signal cancellation problem. One approach is utilizing a subtractive preprocessor prior to computing the array weight vector ("Signal cancellation phenomena in adaptive antennas: Causes and cures", IEEE Trans. Antennas Propagat. vol AP-30, pp. 469-478, May 1982). Unfortunately this approach fails when there are two or more coherent interferences. Another is a "spatial smoothing" approach of preprocessing the array outputs so as to decorrelate the interfering signals from the desired signal ("Adaptive beamforming for coherent signals and interference", IEEE Trans. Acoust., Speech, Signal Processing, vol. ASSP-35, pp. 527-536, Jun. 1985). However, this approach requires a large number of sensors, at least twice as many sensors as incoming sources, or an a priori knowledge of the directions of the interfering sources. Still another technique is one that is capable of nulling coherent as well as incoherent interference while maintaining sensitivity in the signal direction. However, that technique depends on an unusual kind of correlation matrix, a subtractive preprocessor, and having 2 M elements to null M−1 coherent interferences (Bessler et al., "A solution to the adaptive nulling problem with a look-direction constraint in the presence of coherent jammers", IEEE Trans. Antennas Propagat., vol. AP-34, pp. 702-710, May 1986). Another is a null steering approach in which acceptable results are obtained regardless of whether the interferences are coherent or incoherent with the signal or with each other. M−1 nulls can be developed using M elements. However, this method is also deficient in that it also requires an a priori knowledge of the number of and directions of the interfering sources. Generally, these prior art methods are statistical method for use in radar/sonar systems which operate in real time.

II. Occurrence and Identification of Sideswipe

In the ideal acquisition of two dimensional seismic data along a seismic line of profile, the energy gathered by the receivers would all come from a two dimensional data plane encompassing the energy source, receivers and the target geologic event wherein the data plane is generally normal to the earth's surface. The term generally normal is defined as including in the range of about plus or minus 10° of normal. Therefore, the ideal gathering of seismic data would only require receivers in the two dimensional data plane. When the receivers are generally within the two dimensional plane, they are described as being in the line of profile or "in-line". On land, a geophone array in which all of the geophones are placed along the seismic survey line is called an in-line array. The marine equivalent is the use of a single streamer.

The method of the present invention can utilize almost any type of receiver (i.e., geophone, hydrophone, etc.) arrangement, however, the arrangement must include at least one or more receivers located outside of the two dimensional data plane, or beyond what is regarded as generally normal, as defined above. On land this can be accomplished by using almost any type of geophone array, including those as described in the Encyclopedic Dictionary of Exploration Geophysics, R. E. Sheriff, published 1982, herein incorporated by reference. Preferably a rectangular array is the geophone array utilized. While almost any geophone array pattern could be duplicated at sea with hydrophones appropriately arranged on a multiplicity of streamers, the most common hydrophone array suitable for use in the present invention is the marine equivalent to the rectangular array.

In marine seismic operations, the rectangular array is duplicated by utilizing multiple hydrophone streamers. Generally the number of streamers for the present invention ranges from at least two to however many is economical or practical. Preferably, at least three hydrophone streamers are used, most preferably in the range of about three to about five hydrophone streamers. When marine streamers are used, they generally contain in the range of about 32 to about 200 inline sensors. The streamers are generally located in the range of about 60 feet to about 225 feet from each other.

With the present invention, it has been found that the field seismic data, whether marine or land acquired, can be arranged into a form where out-of-plane energy or sideswipe is identifiable from in-line data of interest. This applies to situations where the out-of-plane energy exhibits coherency such as an out-of-plane reflection or another, unwanted energy source.

Since in the present invention the desired data is traveling all within the data plane, generally in the in-line direction, the arrival time of the desired data at any given set of receivers located perpendicular to the in-line direction, occurs at about the same time. However, since the sideswipe is traveling across the data plane, the arrival time of the sideswipe at the same set of receivers located perpendicular or otherwise out-of-plane to the in-line direction varies slightly at each receiver. Thus, the seismic data after acquisition are processed into a form where the varying arrival time of the sideswipe energy is distinguishable from the energy of the desired data. With the present invention, the seismic trace data are assembled into crossline order. The data recorded at hydrophones or geophones having the same source-to-receiver distance or offset are displayed in conjunction with each other.

After the seismic data is recorded by the appropriate receiver geometry having receivers both in and out of the data plane, it is then gathered into traces according to crossline order. The traces can then be examined to determine the number of out-of-plane noises and their corresponding dip in terms of units of time per trace. The slightly different arrival times of the sideswipe at each of the receivers across the common offset produces a distinctive pattern that allows the sideswipe to be identified.

Each of these patterns is identifiable by its "saw tooth" shape, because of the resemblance to the teeth of a saw. The dip of the sawtoothed patterns allows for the determination of the direction of arrival of the sideswipe. With actual field data, the dip of each of the sawtoothed patterns may vary slightly from offset to offset and the average value for all the offsets may thus need to be used. The dip indicates where a null must be formed to remove unwanted sideswipe. More than one sideswipe may be present in the field data. If so, each will exhibit a different dipping pattern when displayed in crossline order. An analyst of ordinary skill can readily identify and characterize dips.

III. Null Filtering Design Criteria

Once the number of unwanted out-of-plane energies and their respective dips have been determined, this information is used to specify a filter that when applied to the seismic data will reduce the unwanted out-of-plane energy in the seismic data by applying a null for all frequencies in the direction of the dips as determined above. Any array processing null steering technique that applies a null for all frequencies in the direction of the dips as required can be utilized as the seismic filter once filtering criteria set forth below have been specified in the manner set forth below.

Figure 5:
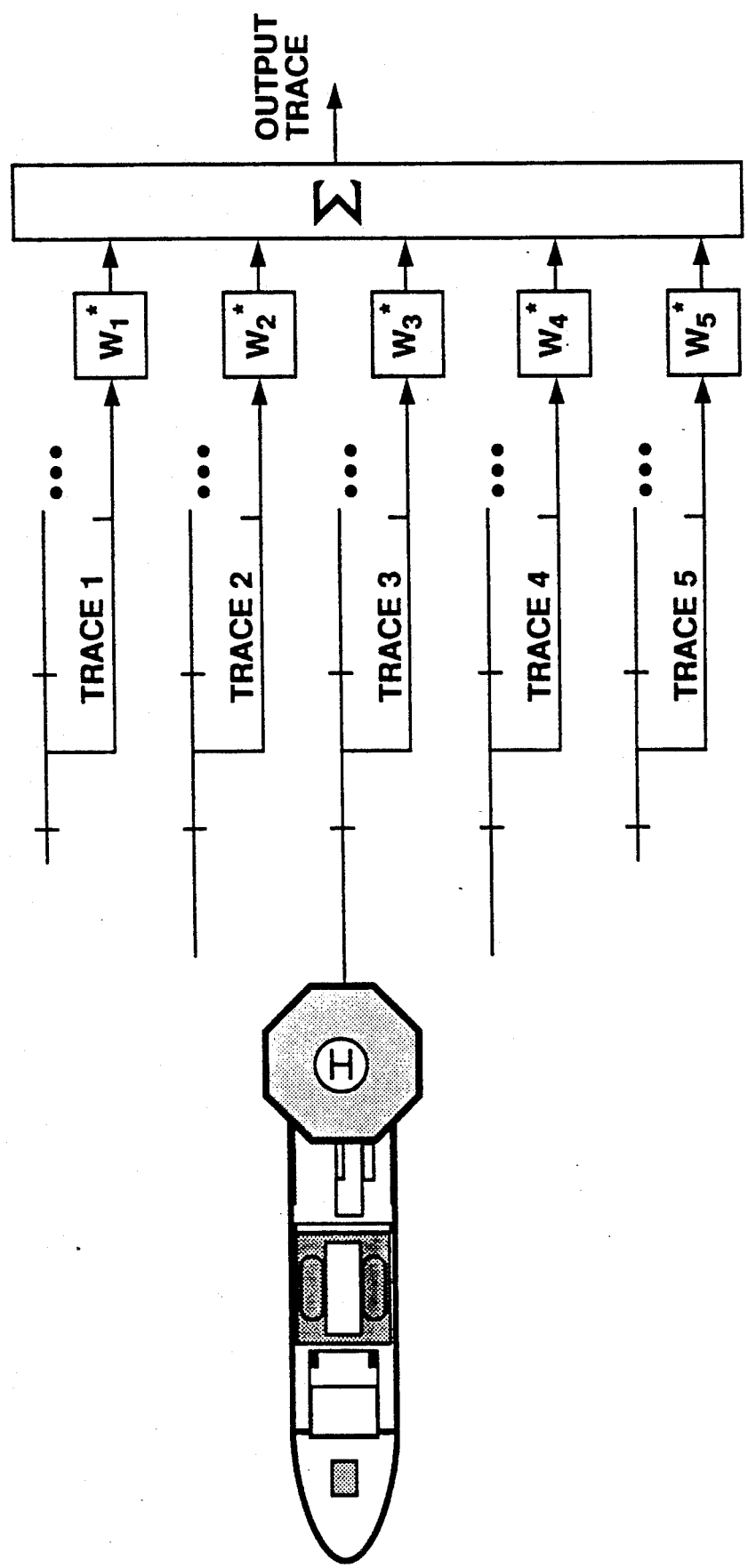
FIG. 5 is a schematic diagram of the processing method of the present invention.

FIG. 5 is a schematic diagram of the processing method of the present invention and illustrates how null steer processing is accomplished. Each frequency in each trace is multiplied by a complex weight, $W^*$. At any particular frequency, the weights for an array shape the receiving pattern for that array so that a null is directed at the unwanted out-of-plane sideswipe energy, while sensitivity to the inline energy along the seismic line-of-profile is maintained. The amplitude and phase relationship among the weights ensures a null for the unwanted out-of-plane sideswipe energy traveling across the seismic line-of-profile. Inline sensitivity is maintained by constraining the sum of the weights to be unity. Hence, all events along the seismic line-of-profile are passed without distortion while cross-line dipping energy is attenuated.

Figure 6:
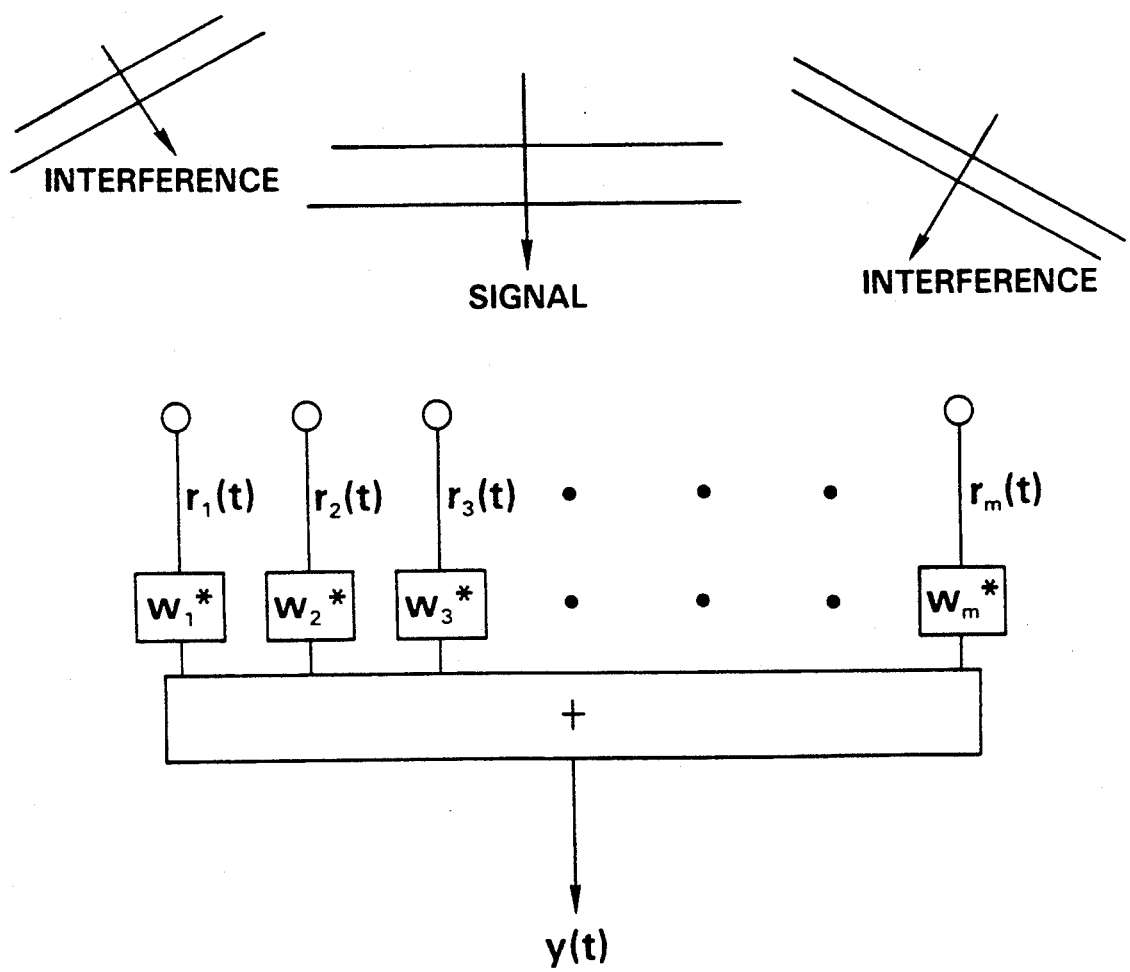
FIG. 6 shows schematically a processing technique for a desired signal and interfering energy impinging on a sensor array.

FIG. 6 shows schematically a processing technique for a desired signal and interferences impinging on a sensor array. To simplify the analysis, it is assumed that the K incident wave fields are planar and monochromatic. Incident pulses have to be decomposed into their Fourier components in order to properly utilize the results developed. The $m^{th}$ sensor's output is $r_m(t)$ and the array's output y(t) is given by:

$$y(t) = \sum_{m=1}^{M} w^*_m r_m(t) \quad \text{(Equation 1)}$$

where * means complex conjugate. The first sensor (m=1) serves as the phase reference and the origin for the coordinate frame. The desired signal at the first sensor, $s_1(t)$, is from an inline direction along the seismic line-of-profile, and the interferences at the other sensors, $s_k(t)$ $k=2, \ldots, K$, arrive from other directions. Now, the output of the $m^{th}$ sensor can be expressed as $$r_m(t) = \sum_{k=1}^{K} S_k(t) e^{j2\pi f \tau_{km}} + n_m(t) \quad \text{(Equation 2)}$$

where f is the frequency of the incoming waves, $\tau_{km}$ is the difference in the arrival times at the $m^{th}$ sensor and first sensor for the $k^{th}$ incident wave (note $\tau_{k1}=0$), and $n_m(t)$ is additive noise. The noise is assumed to a zero-mean white Gaussian stationary random process that is uncorrelated with the incoming waves and also from sensor to sensor.

In general, the time delay $\tau_{km}$ can be written as $\hat{R}_k \cdot r_m / c$ where $\hat{R}_k$ is the unit vector in the direction of the $k^{th}$ incoming wave and $r_m$ is the position vector of the $m^{th}$ sensor relative to the first one, and c is the propagation velocity of the incoming waves.

Attention is now directed to cross-line interferences and linear arrays with uniform sensor spacing, $\Delta$. Except for sensor number one at the origin, the sensors reside along the negative Y-axis and the Z-axis is directed vertically into the ocean (or ground); hence, cross-line interference resides in the YZ-plane. For the $k^{th}$ interference, $\tau_{km} = -\Delta(m-1)\sin\theta_k \sin\phi_k / c = \tau_k(m-1)$, where $\Theta_k$ is the polar angle, $\phi_k$ is the azimuthal angle, and $\tau_k$ is the dip (second/trace) of the $k^{th}$ interference. The interference has a positive dip when it moves across the array in the positive Y-direction.

The following column vector expresses the phase shift across the array for the $k^{th}$ incident wave:

Equation 3

$$a_k = [1 e^{j2\pi f \tau_k} \ldots e^{j2\pi f(m-1)\tau_k}]^T$$

where T means transpose. Sensor spacing is assumed to be less than a half wavelength so that column vectors $a_k$ (k=1,2,...,K) are linearly independent for distinct directions of arrival. Note, the column vector for inline signals is Equation 4

$$a_1 = [1 \; 1 \; 1 \ldots 1]^T$$

The sensor output vector, r(t), can be written as

Equation 5

$$r(t) = [r_1(t) r_2(t) \ldots r_M(t)]^T$$

Similarity s(t) and n(t) vectors can be written as follows

Equation 6

$$s(t) = [S_1(t) S_2(t) \ldots S_k(t)]^T$$

Equation 7

$$n = [n_1(t) n_2(t) \ldots n_M(t)]^T$$

Equation (5) can now be expressed as

Equation 8

$$r(t) = As(t) + n(t)$$

where A is a MxK 'Vandermonde' matrix whose $k^{th}$ column is the column vector $a_k$, given by Equation 3.

The covariance matrix for the sensor outputs is

Equation 9

$$R = E\{(r^{\dagger}(t) R(t)\} = ASA^{\dagger} + \sigma^2 I$$

where E{} means expectation value, $\dagger$ denotes complex conjugate transpose, $S = E\{s(t)s^{\dagger}(t)\}$ is the covariance matrix for all the incoming waves, $\sigma^2$ is the variance of the additive noise, and I is the identity matrix. Now partition the signal vector s(t)

Equation 10

$$s(t) = S_1(t) a_1 + \tilde{A} \tilde{s}(t) + n(t)$$

where $\tilde{s}(t)$ is the interference vector. In analogous fashion matrix A can be partitioned.

Equation 11

$$A = [a_1 \tilde{A}]$$

These two expressions can now be used as follows:

Equation 12

$$r(t) = S_1 a_1 + \tilde{A} \tilde{s}(t) + n(t)$$

The problem is to find a weight vector w that, in some sense, provides a best estimate, $y(t) = \hat{s}_1(t)$, for the desired signals $s_1(t)$:

Equation 13

$$\hat{s}_1(t) = y(t) = w^{\dagger} r(t).$$

Now substitute Equation 12 into Equation 13 and use the constraint, $w^{\dagger} a_1 = 1$ to ensure unity response to inline signals to yield:

Equation 14

$$\hat{s}_1(t) = s_1(t) + w^{\dagger} \tilde{A} \tilde{s}(t) + w^{\dagger} n(t).$$

Equation (14) can be now be expressed in the following form

Equation 15

$$\hat{s}s_1(t) = s1(t) + \epsilon(t)$$

where the error $\epsilon(t) = w^{\dagger} \tilde{A} \tilde{s}(t) + w^{\dagger} n(t)$ is the undesired contribution of the interferences and noise.

Next, minimize $\epsilon(t)$ while establishing nulls in the directions of the individual interferences regardless of their mutual correlation or correlation with the desired signal. Therefore, consider the following as the criteria: (a) minimize the undesired contribution of the interferences and noise Equation 16

$$\min E\{\epsilon^{\dagger}(t) \epsilon(t)\}$$

while (b) constraining w to provide a null in the interference directions,

Equation 17

$$w^{\dagger} a_k = 0, \; k \neq 1$$

and (c) while also providing a unit response for inline signals

Equation 18

$$w^\dagger a_1 = 1$$

Start by considering Equation (17). The approach to satisfying Equation (17) is best described in terms of the interference subspace R(A), a (K−1) dimensional subspace of $C^M$ spanned by the columns of the interference direction matrix A. The basic idea is to ensure $w^\dagger a_k = 0$ (k≠1) by requiring that w reside in R(A)'s orthogonal complement subspace, $R^\perp(A)$.

A vector basis for this orthogonal complement subspace can be explicitly constructed from a (K−1)-order polynomial b(z)

Equation 19

$$b(z) = b_0 z^{K-1} + b_1 z^{K-2} + \ldots + b_{K-1}$$

whose roots, $z_k = e^{j2\pi f \tau_k}$, k=2, ..., K, correspond to the interference directions. If the number of interferences, (K−1), and their individual dips, $\tau_k$ are known then the coefficient vector $b = [b_0 b_1 \ldots b_{k-1}]$ can be determined. This is accomplished by solving the K−1 set of homogeneous equations developed using Equation 19. A Toeplitz matrix B can then be constructed using the coefficient vector $b = [b_0 b_1 \ldots b_{k-1}]$.

(Equation 20)

$$B = \begin{bmatrix} b^*_{K-1} & & 0 \\ \vdots & \ddots & \\ b^*_\cdot & & b^*_{K-1} \\ & \ddots & \vdots \\ 0 & & b^*_\cdot \end{bmatrix}$$

This matrix has dimensions Mx(M−K+1), and its columns form a basis for $R^\perp(A)$. Its columns are orthogonal to all but the direction vector for inline signals Equation 21

$$B^\dagger a_k = 0 \quad k=2, \ldots, K$$

Equation 22

$$B^\dagger a_1 \neq 0$$

Hence, nulls are forced in the interfering directions by requiring

Equation 23

$$W = B u$$

for some vector $u \in C^{M-K+1}$. The vector u is determined so as to satisfy the remaining constraints. These constraints, Equations (16) and (18), can now be rewritten as follows:

Equation 24

$$\min u^\dagger B^\dagger B u$$

Equation 25

$$uB^\dagger a_1 = 1$$

where Equation (23) and Equation (21) have been used. Finally, solve Equation (24) for u via Lagrange undetermined multipliers using Equation (25) as a constraint Equation 26

$$w = \frac{P_B a_1}{a_1 P_B a_1}$$

where $P_B = B(B^\dagger B)^{-1} B^\dagger$ is the projection matrix onto $R(B) = R^\perp(A)$.

The foregoing description of filter design criteria is directed to how to find the weight vector for a single time harmonic frequency. In seismic applications it is necessary to find a weight vector for each Fourier frequency component across the seismic band. Therefore, the present invention requires finding B, $P_B$, and w for each frequency component of interest in the seismic band.

This development is for uniform spacing Δ. However, the development can be extended to non-uniform spacing. This can be done by setting the spacing Δ of Equation 3 equal to the average sensor spacing and including an additional phasor for each frequency f in each of the terms of Equation (19). This phasor accounts for the difference between $\tau_{km}$ and $\tau_k$. The coefficient vector is then determined by solving the simultaneous equations developed using Equation (19). The resulting coefficient vector leads to a Toeplitz matrix (Equation (20)) that satisfies Equations (21) and (22).

Once a seismic filter is so designed, it is then applied to the seismic data in a computer to null steer or remove all frequencies for the events having the form of a series of sawtoothed seismic events, thereby removing the effects of unwanted out-of-plane energy from the seismic survey data.

IV. Examples

A. Example 1

Application to Five Streamer Synthetic Data with One Sideswipe

Figure 7:
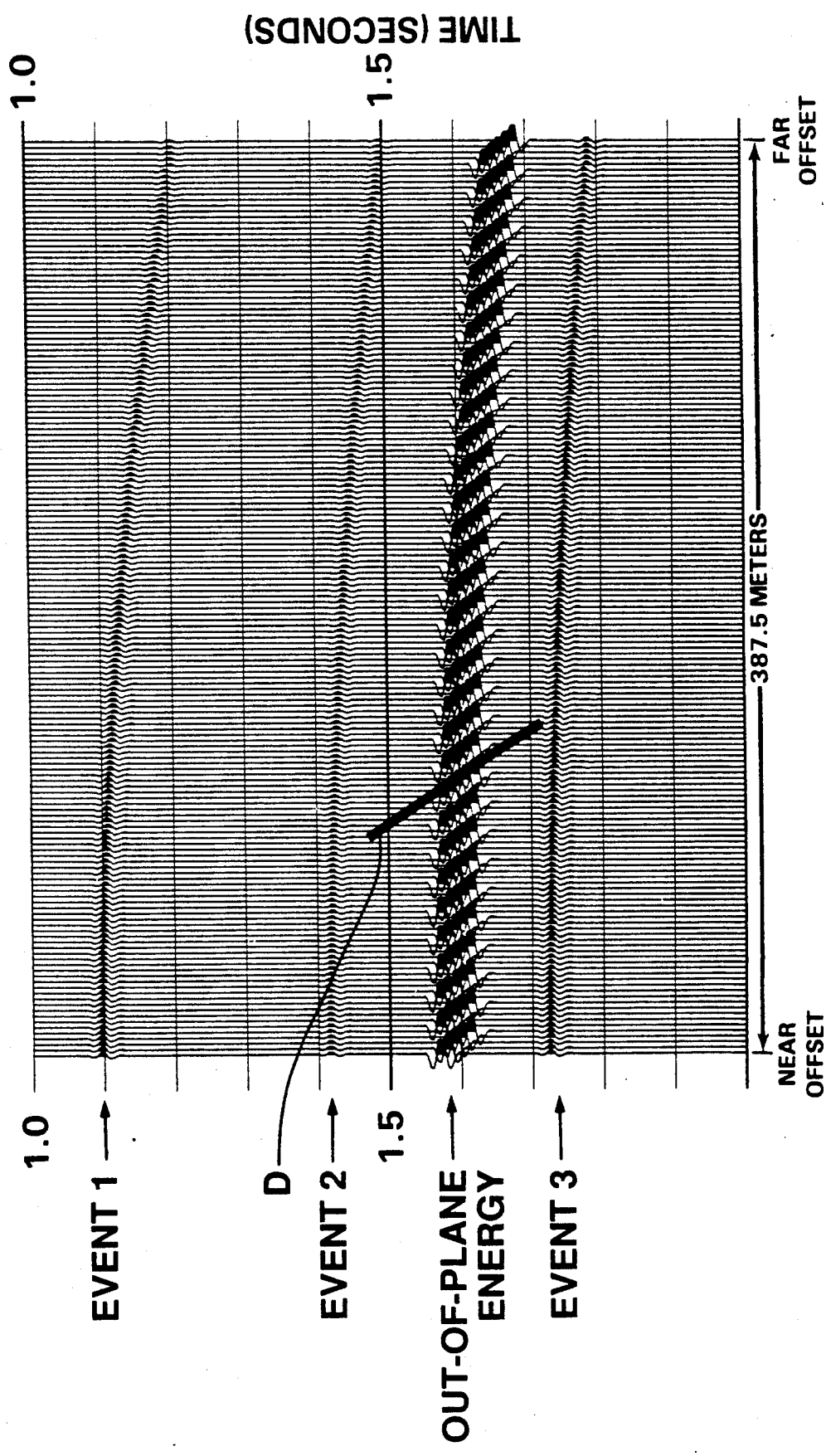
FIG. 7 is a plot of synthetic seismic data containing both desired seismic events and unwanted energy.

FIG. 7 is a plot of synthetic seismic data containing three desired seismic events in a line of profile and one unwanted out of plane energy in a five streamer synthetic shot record. The traces have been sorted to crossline order before plotting. The sideswipe is at about 1.6 seconds. At any given offset, an inline signal from any of the three events arrives at the five streamers at about the same time. However, this does not hold true for the out-of-plane energy. At any particular offset the sideswipe arrives at each streamer at a different time and exhibits a series of dipping 'saw tooth' patterns that repeats at each offset. Thus when the recorded traces from all five streamers are properly gathered and plotted in common offset order, unwanted out-of-plane energy exhibits a series of sawtoothed patterns. Each pattern will have a dip (milliseconds/trace or ms/tr) such as line D shown for one of the sawtoothed patterns. The dip for the out-of-plane energy will be the average dip of the sawtoothed patterns. Once the number of sideswipes and their respective dips are known, that information may be used to design a filter to null sawtoothed seismic events. The filter is applied to the seismic data by a computer.

In this Example, there was only one out-of-plane energy and its dip was determined to be 10.4 ms/trace. This information was then used in the adapted Bessler et al. method to design a filter to null those events this dip. The filter was then applied by a computer. As FIGS. 8a, 8b, and 8c show, application of the method of this invention significantly reduced the sideswipe energy.

Figure 2:
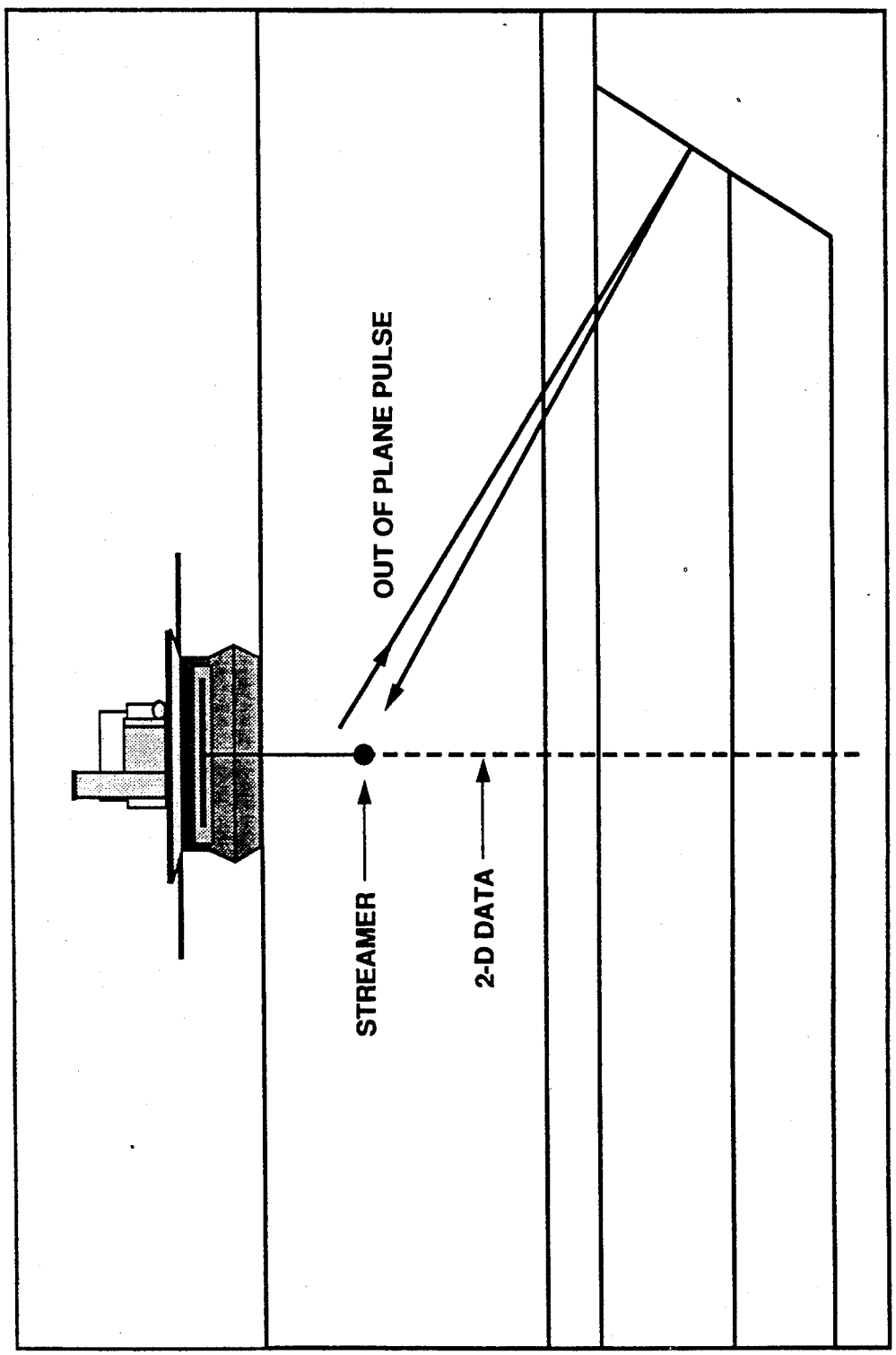
FIG. 2 is a representation showing cross-line noise occurring in the acquisition of marine seismic data.
Figure 8:
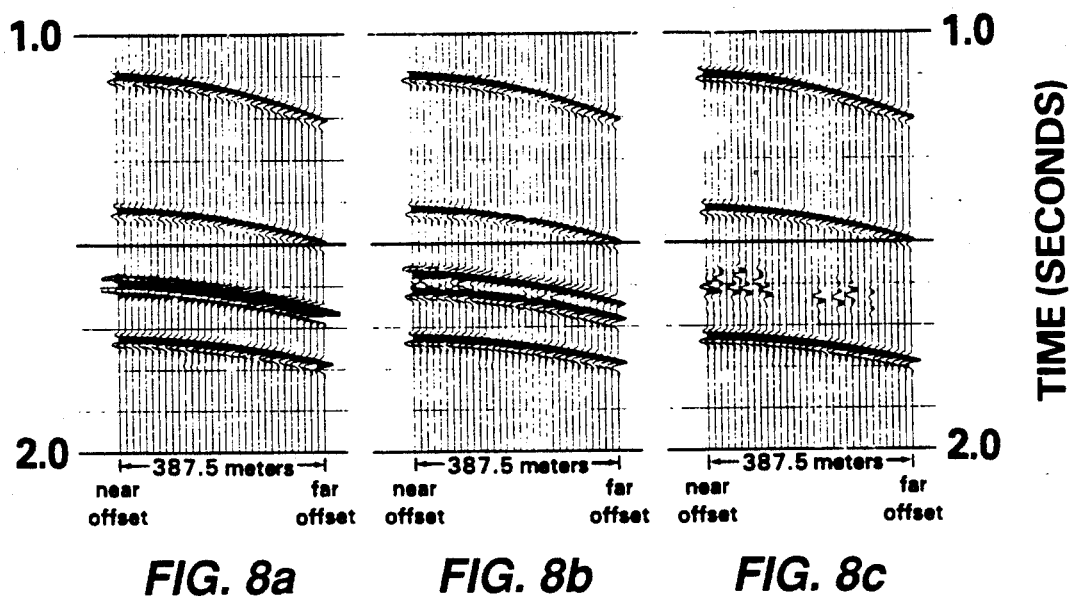
FIG. 8a is a plot of the center streamer data of the synthetic data of FIG. 7.
FIG. 8b is a plot showing the summation of the cross-line traces at each offset for the synthetic data of FIG. 7.
FIG. 8c is a plot which shows the synthetic data of FIG. 7 processed by the method of this invention.

FIG. 8a is a plot of the center steamer data of the synthetic data of FIG. 7 and shows synthetic traces as if recorded by the center streamer. It illustrates how the data would look had it been gathered using only a single streamer configuration as shown in FIG. 2. With single streamer data, it is difficult with the prior art methods to determine which event is sideswipe.

FIG. 8b is a plot showing the results of a simple summation of the cross-line traces at each offset for the synthetic data of FIG. 7, showing the result obtained by simply adding the cross-line traces at each offset. This cross-line summation cancels the central portion of the sideswipe at about 1.6 sec. while leaving the residual leading and trailing edges. FIG. 8c is a plot of the synthetic data of FIG. 7 according to the method of the present invention.

B. Example 2

Figure 9:
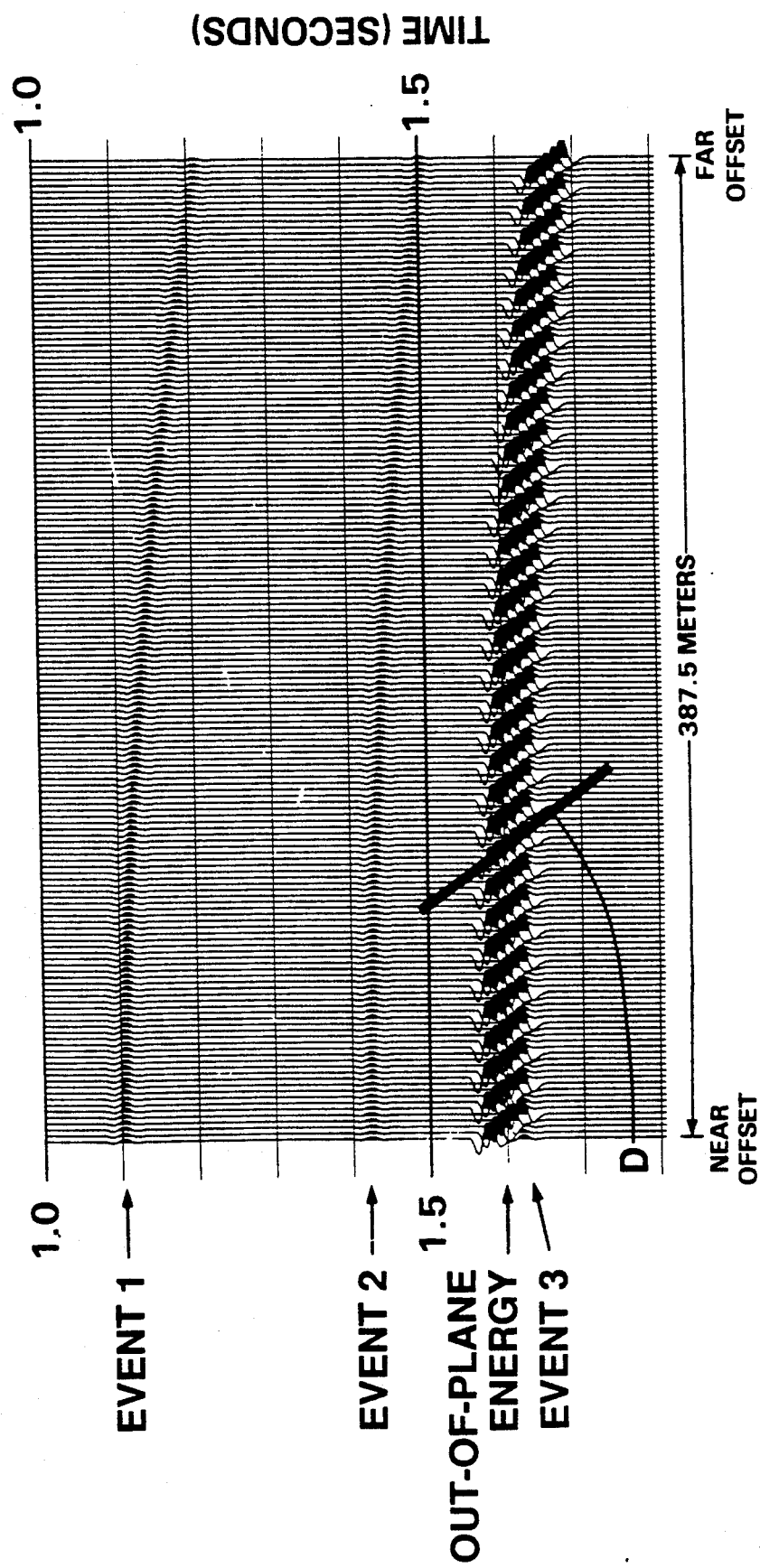
FIG. 9 is a plot of synthetic seismic data containing unwanted out-of-plane energy that masks a desired event.

Application to Five Streamer Synthetic Data with One SideSwipe that Masks a True Signal The synthetic data of Example 1 was modified to move Event 3 in time so that the unwanted out-of-plane energy would mask the third signal of profile event. FIG. 9 is a plot of this synthetic data with unwanted out-of-plane energy or sideswipe masking a desired event. It can be seen that masked Event 3 is barely distinguishable at the near offset, and is completely masked at the other offsets. Again, each of the sawtoothed patterns will have a dip such as line D shown for one of the sawtoothed patterns. The dip of the sideswipe energy will be equal to the average dip of the sawtoothed patterns.

As in the above Example, there was only one out-of-plane energy and its dip was determined to be 10.4 ms/trace. This information was then used in the adapted Bessler method to design a filter to null those events having this dip. The filter was then applied by a computer. As FIGS. 10a, 10b, and 10c show, application of the method of this invention not only significantly reduced the sideswipe, but also unmasked a desired event.

Figures 10A, 10B, 10C:
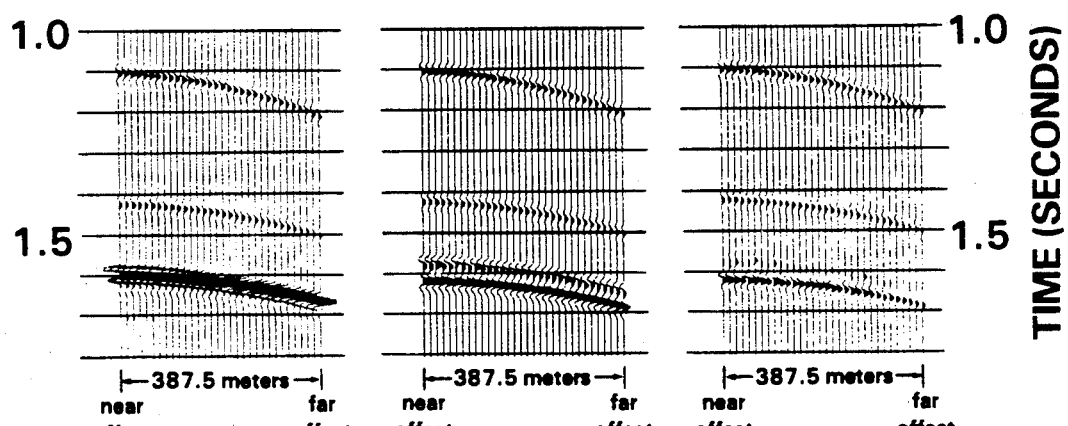
FIG. 10a is a plot of the center streamer data of the synthetic data of FIG. 9.
FIG. 10b is a plot showing the summation of the cross-line traces at each offset for the synthetic data of FIG. 9.
FIG. 10c shows the synthetic data of FIG. 9 processed by the method of this invention.

FIG. 10a is a plot of the center streamer data of the synthetic data of FIG. 9. FIG. 10b is a plot showing a simple summation of the cross-line traces at each offset for the synthetic data of FIG. 9. FIG. 10c shows the synthetic data of FIG. 9 processed by the method of this invention. As in the preceding example, the center streamer data (FIG. 10a) is corrupted significantly while the simple sum (FIG. 10b) attenuates the central portion of the sideswipe. It is also to be noted the trailing edge of the out-of-plane energy in FIG. 10b is stronger than the leading edge. This is different from the simple sum result shown in FIG. 8b. The reason is that the trailing edge now contains both seismic line-of-profile event energy and residual sideswipe. FIG. 10c shows the results after applying the null steer method of the present invention. The sideswipe is essentially removed and Event 3 is unmasked and clearly evident.

C. Example 3

Application to Seven Streamer Synthetic Data with Two Sideswipes

Figure 11:
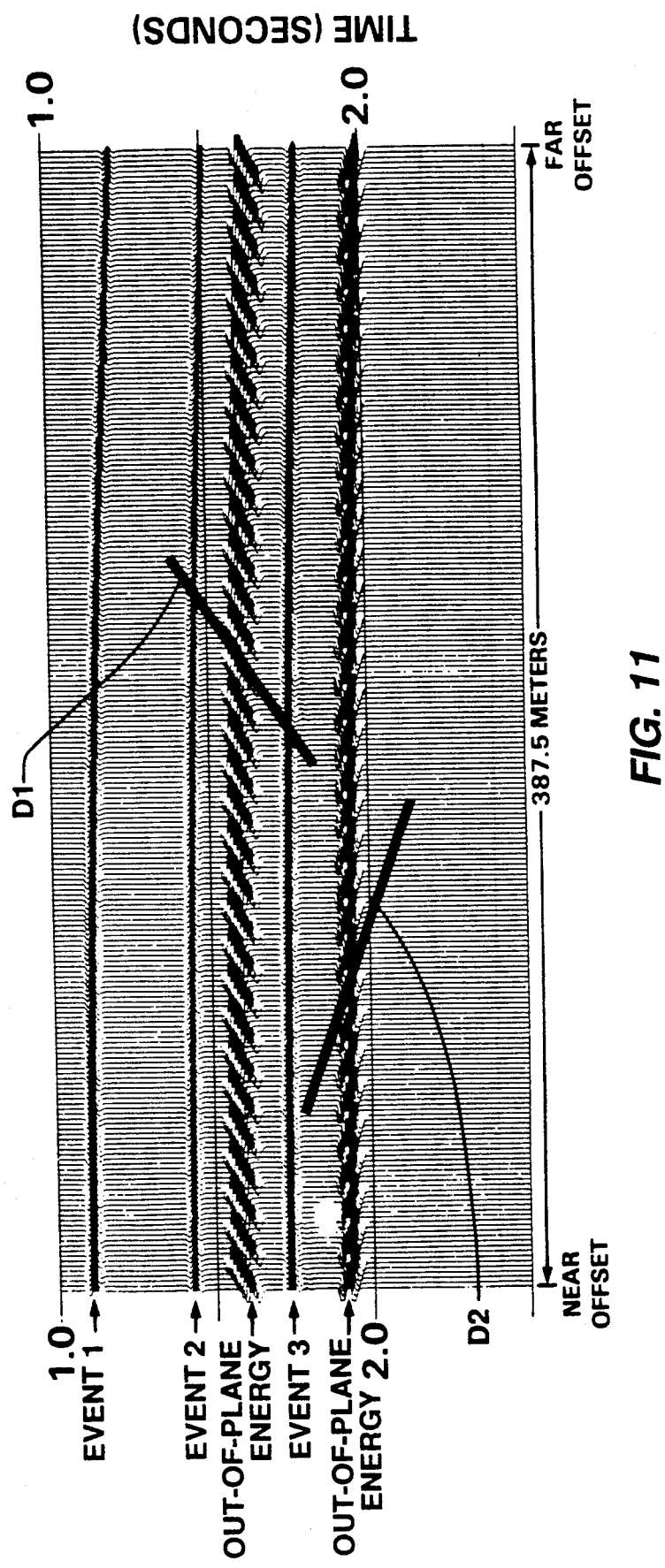
FIG. 11 is a plot of synthetic seismic data containing both desired events and unwanted out-of-plane energy.

FIG. 11 is a plot of synthetic data containing both desired seismic events and unwanted out-of-plane energy, having two different out-of-plane or sideswipe events. These events are easily identified on the plot by their repeating sawtoothed patterns. The sideswipe at 1.9 seconds has less cross-line dip D2 (determined to be 4.9 ms/trace) than cross-line dip D1 of the sideswipe at 1.6 seconds (determined to be −10.6 ms/trace). Each of the dipping patterns of the sideswipe energy at 1.6 seconds will have a dip such as D1 shown for one of the sawtoothed patterns. The average dip of the sideswipe energy at 1.6 seconds will be the average dip of the sawtoothed patterns. Likewise, each of the sawtoothed patterns of the sideswipe energy at 1.9 seconds will have a dip such as D2 shown for one of the sawtoothed patterns. The average dip of the sideswipe energy at 1.9 seconds will be the average dip of the sawtoothed patterns.

Using the above information, a seismic filter to null both events was designed according to the adapted Bessler method. The filter was then applied to the seismic data by a computer. As FIGS. 12a, 12b, and 12c show, application of the method of this invention significantly reduced the sideswipe.

Figures 12A, 12B, 12C:
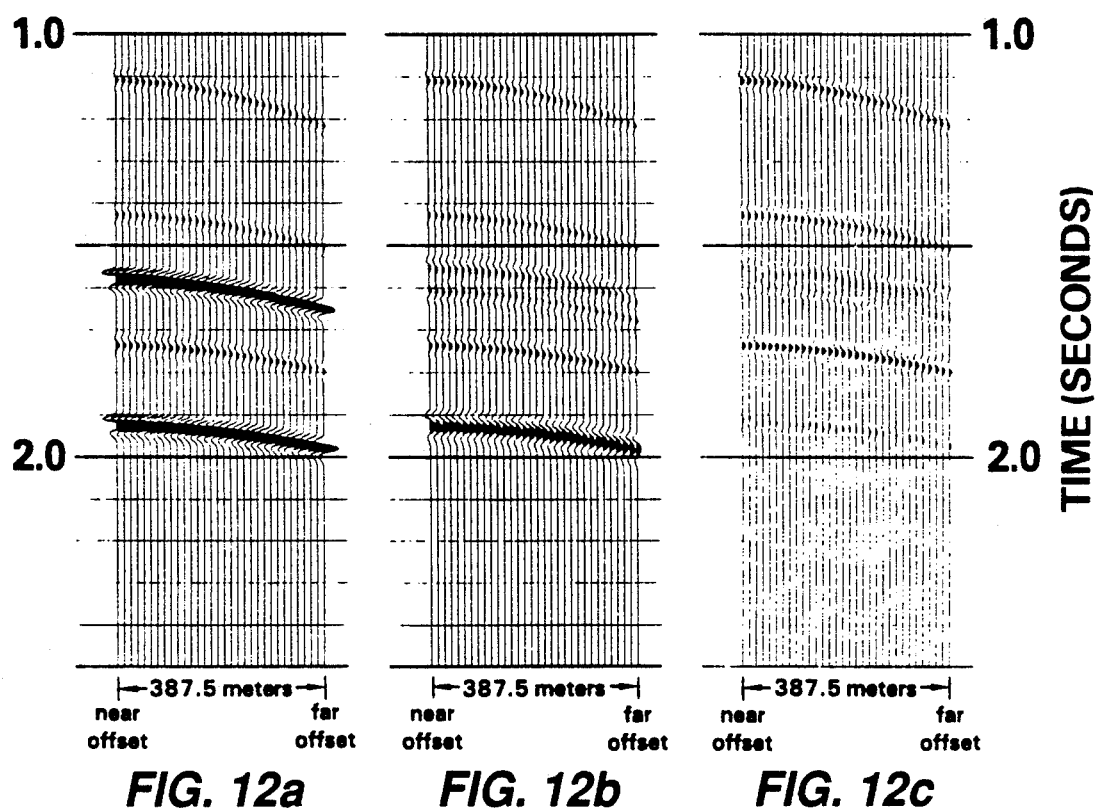
FIG. 12a is a plot of the center streamer data of the synthetic data of FIG. 11.
FIG. 12b is a plot showing the summation of the cross-line traces at each offset for the synthetic data of FIG. 11.
FIG. 12c shows the synthetic data of FIG. 11 processed by the method of this invention.

FIG. 12a is a plot of the center streamer data of the synthetic data of FIG. 11. FIG. 12b is a plot showing the result of simple summation of the cross-line traces at each offset for the synthetic data of FIG. 11. FIG. 12c shows the synthetic data of FIG. 11 processed by the method of this invention. These plots illustrate that simple summation does very little to attenuate the sideswipe at 1.9 seconds and it again leaves leading and trailing sideswipe edges on the sideswipe at 1.6 seconds. As the plot FIG. 12c shows, the processing method of the present invention effectively cancels both sideswipe from the data.

D. Example 4

Application to Five Streamer Data From the Gulf of Mexico Near a Large Salt Diapir The method of the present invention was tested on two five streamer test lines of data acquired in the Gulf of Mexico. A deep water area (1400 feet) was chosen because a large amount of out-of-plane energy was expected due to a nearby salt diapir and because of the availability of data from a three dimensional survey and well data, which would provide a performance measure and control for the method of the present invention. Ideally, three dimensional migration of three dimensional data would move the sideswipe energy to its true position and provide a performance measure.

The first test line, or Test Line No. 1, is approximately 3000 feet from the salt diapir, and the second, or Test Line No. 2 ranges from about 600 feet to approximately 3000 feet from the salt diapir. Because of limits on amount of available cable, the four outer streamers were shorter, 800 m in length (32 stations), as contrasted with a longer center streamer (2700 m and 108 stations). Streamer spacing (cross-line direction) was 30 m and the inline receiver station spacing and shot intervals were both 25 m. This resulted in the outer streamers acquiring 16 fold data while the center streamer acquired 54 fold data.

Figure 13A:
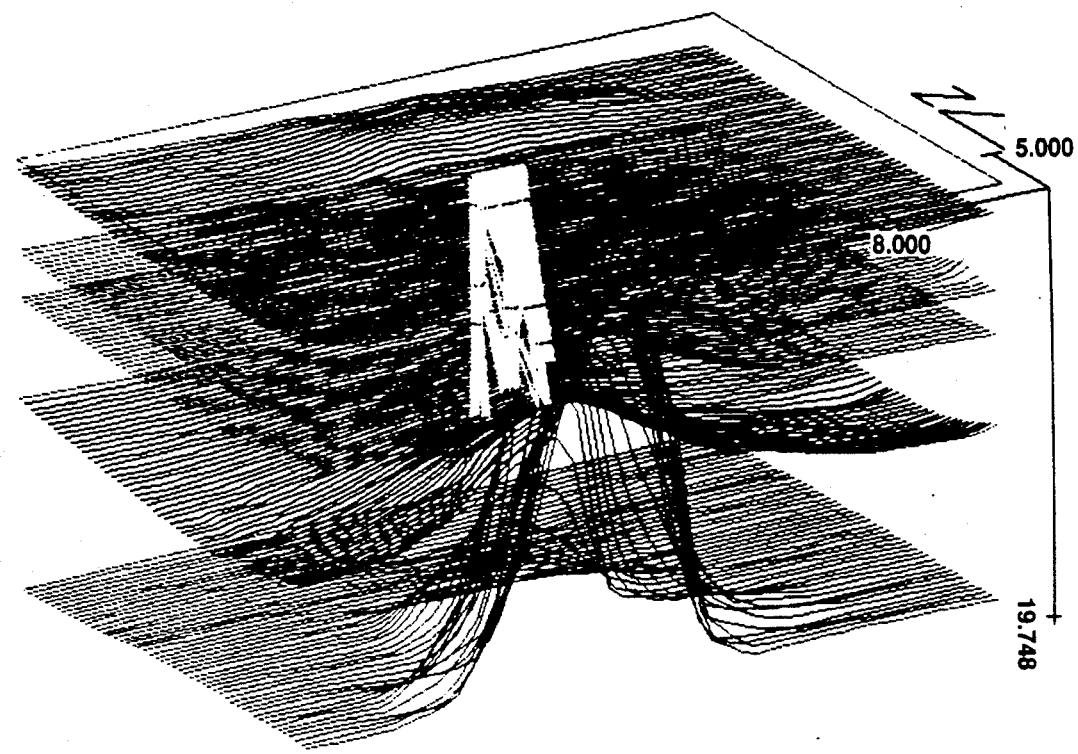
FIG. 13a and 13b are three-dimensional plots of field seismic data obtained in a seismic survey near a salt diapir.
Figure 13B:
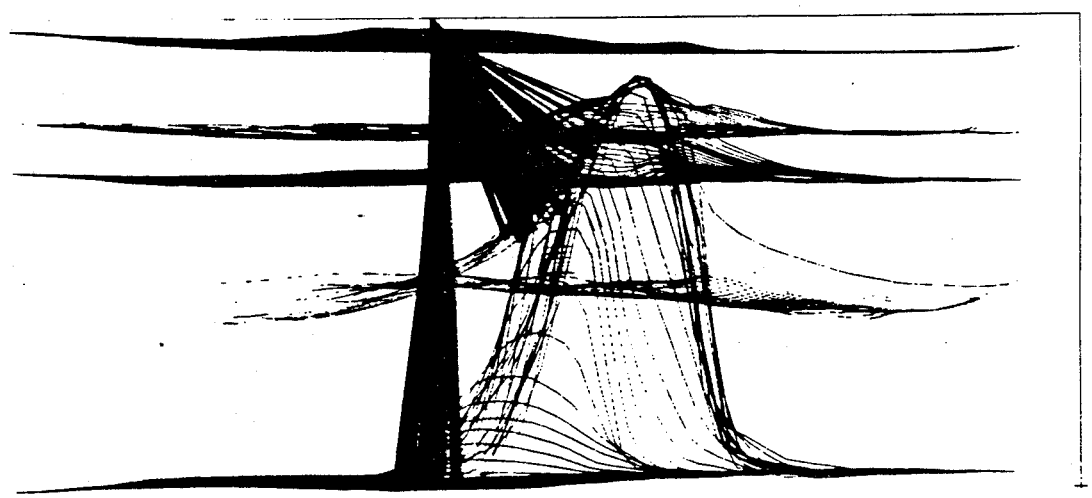

FIGS. 13a and 13b are plots of a three dimensional model built by digitizing 4 horizons and the salt structure near the salt diapir utilizing a known, commercially available modeling package from Sierra Geophysics of Seattle, Wash. The plots illustrate an abundance of energy reflecting off the salt diapir, and when the resulting model traces are gathered into cross-line order and plotted, the presence of sideswipe is recognized by the saw-tooth pattern.

Test Line No. 1

Figure 14:
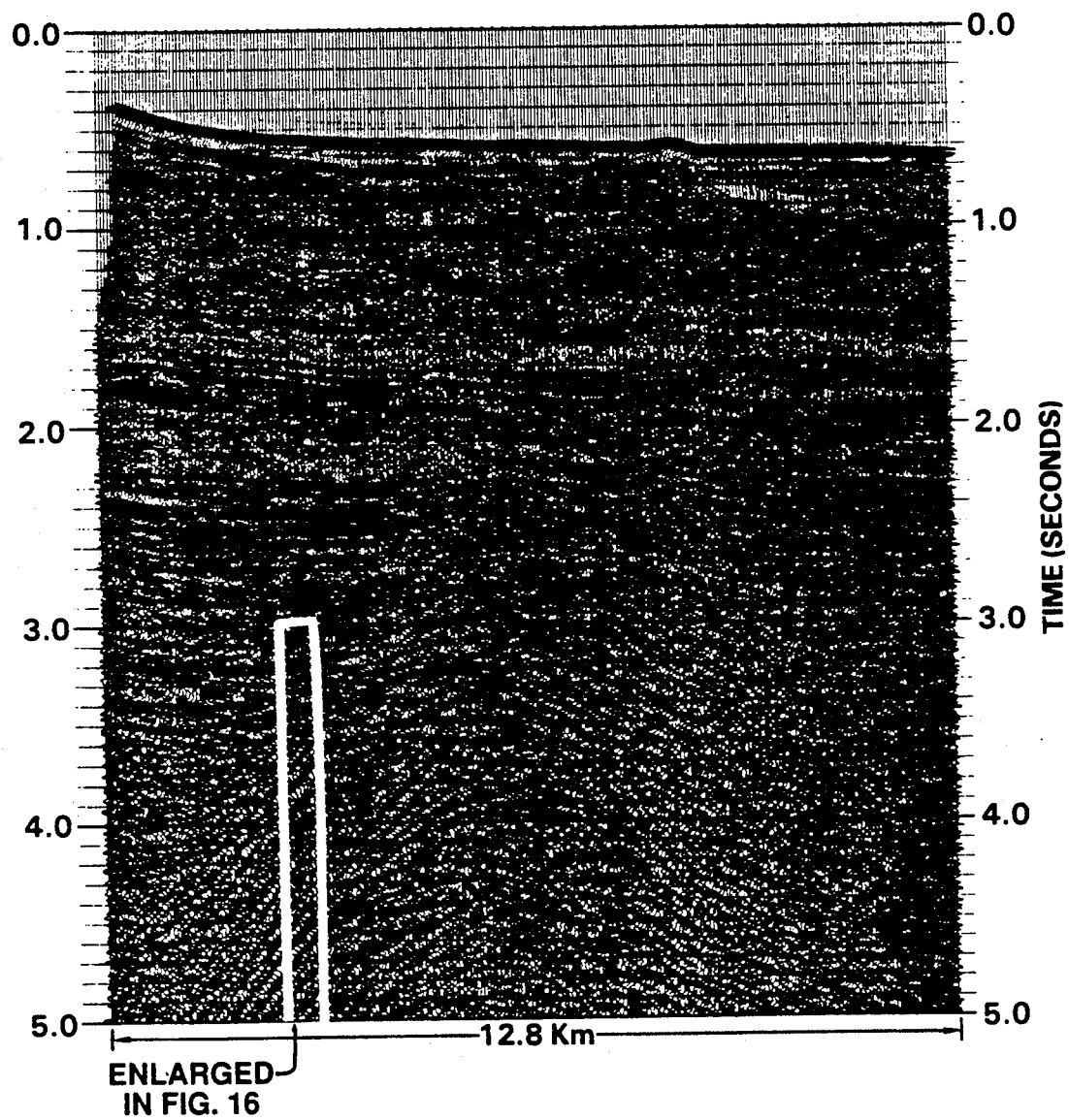
FIG. 14 is a plot of stacked center streamer data along a line of profile in the survey area of the data of FIGS. 13a and 13b.
Figure 15A:
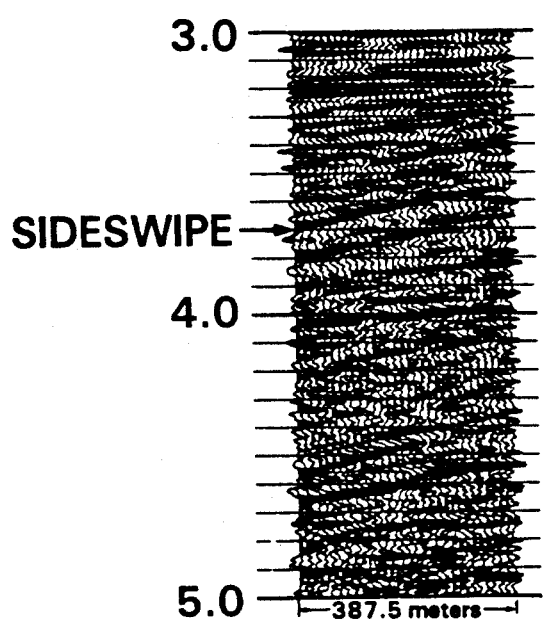
FIG. 15a is an enlarged portion of the plot of FIG. 14.
Figure 15B:
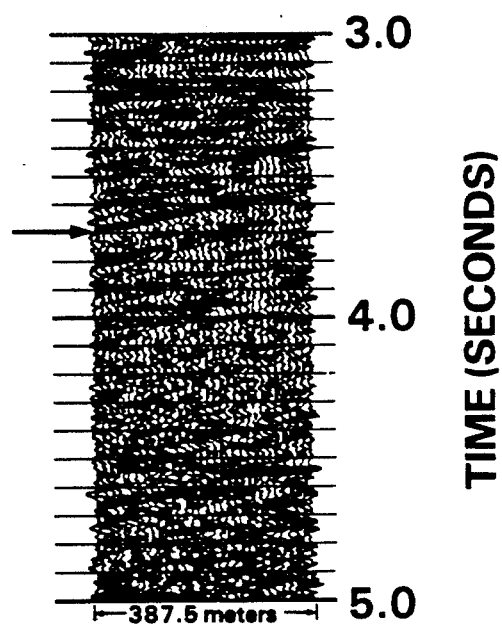
FIG. 15b is a plot of the same data as FIG. 15a after further processing.

The Example of Test Line No. 1 illustrates that the present invention can also be applied to stacked seismic data. FIG. 14 is a plot of stacked data from the center streamer from Line No. 1. Only the near 32 traces (16 fold) were used in the stack to be compatible with the cross-line sum and null steer processing. The positive identification of sideswipe on the data is very difficult without cross-line information. FIG. 15a is an enlarged portion of that area enclosed in the rectangle shown in FIG. 14 of the plot Line No. 1. FIG. 15b is a shot record, with normal move out ("NMO") applied, from the same area are displayed in FIG. 15a.

Figure 16:
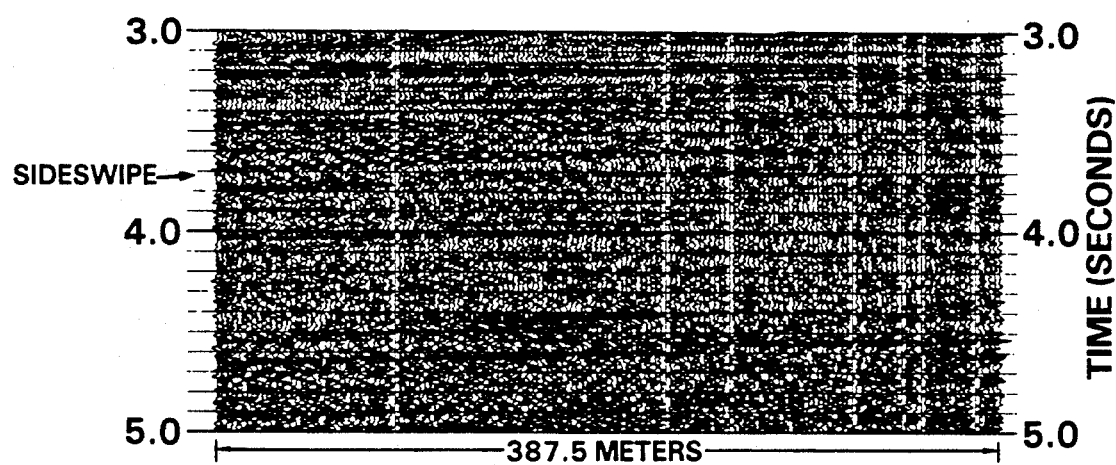
FIG. 16 is an enlarged plot of the data of FIG. 15a in cross-line order.

In order to identify the sideswipe, the same shot record from all 5 streamers was gathered into cross-line order and plotted (FIG. 16). A strong out-of-plane event, sideswipe, as evidenced by the series of repeating sawtoothed patterns, can now be identified moving across the shot record (starting on the left at about 3.7 seconds).

Figure 17:
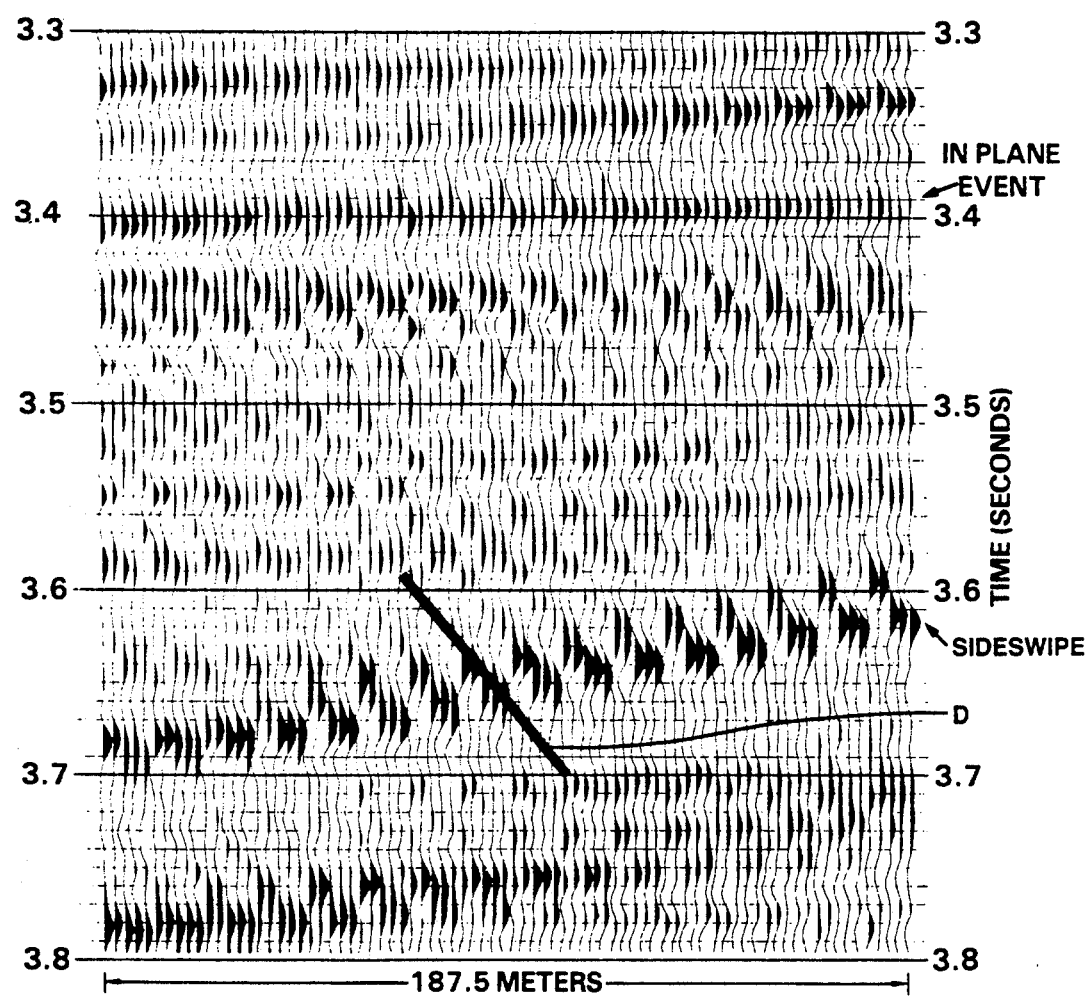
FIG. 17 is an enlarged plot of a portion of FIG. 16.

FIG. 17 is plot showing an enlarged portion of the first 187.5 meters of FIG. 16 and shows an indicated in-plane event at 3.4 seconds on the left, with no or very little time delay between streamers, and an out-of-plane event or sideswipe starting at 3.7 seconds on the left in which the time delay between streamers is approximately 5 ms/trace (or 9° from vertical).

Notice, as might be expected, the repeating sawtoothed pattern in real data is not as clean as in the model data. However, as will be shown, the method of the present invention is robust enough to compensate for less than ideal sideswipe patterns. Again, each of the sawtooth patterns will have a dip such as line D shown for one of the sawtoothed patterns. The dip of the sideswipe energy will be equal to the average dip of the sawtoothed patterns.

The dips and the number of unwanted out-of-plane energies was then used to design a seismic filter according to the method of Bessler et al., that would null both events. The filter was then applied to the seismic data with a computer.

Figure 18:
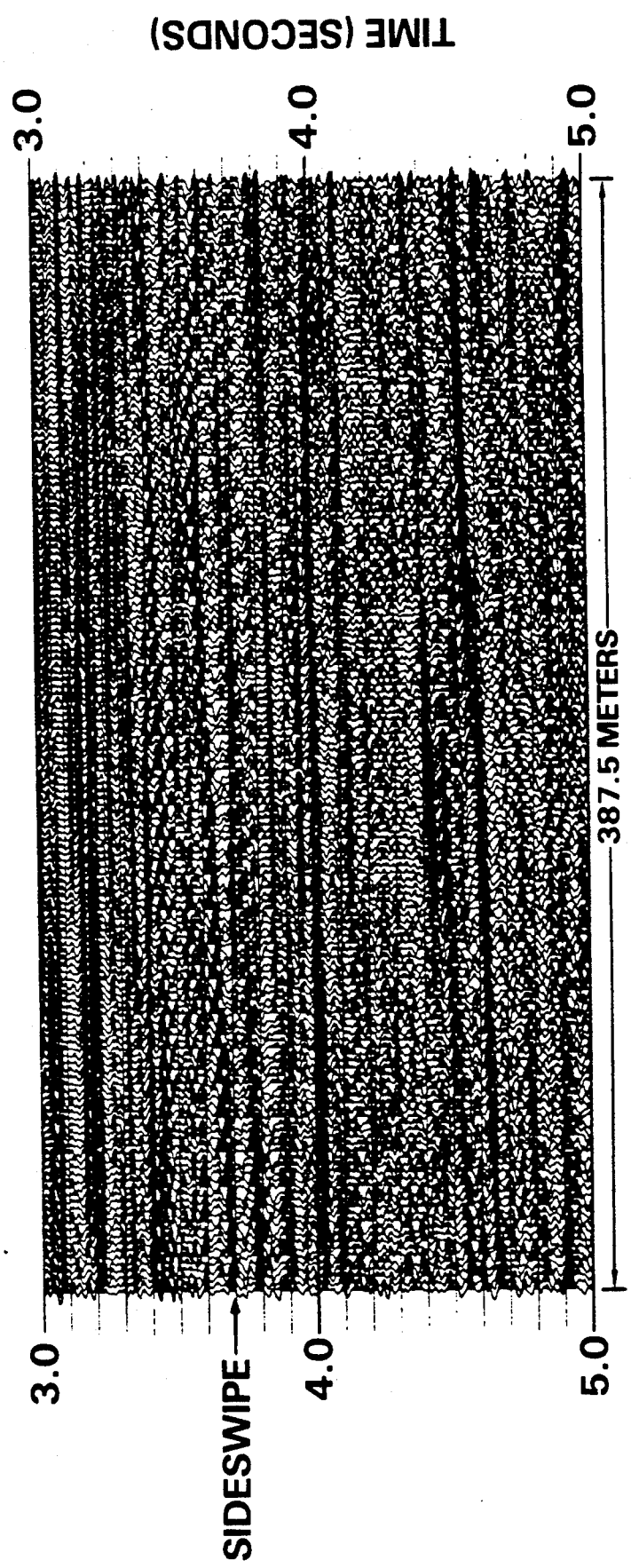
FIG. 18 is a plot of the data of FIG. 16 after further processing.
Figures 19A, 19B, 19C:
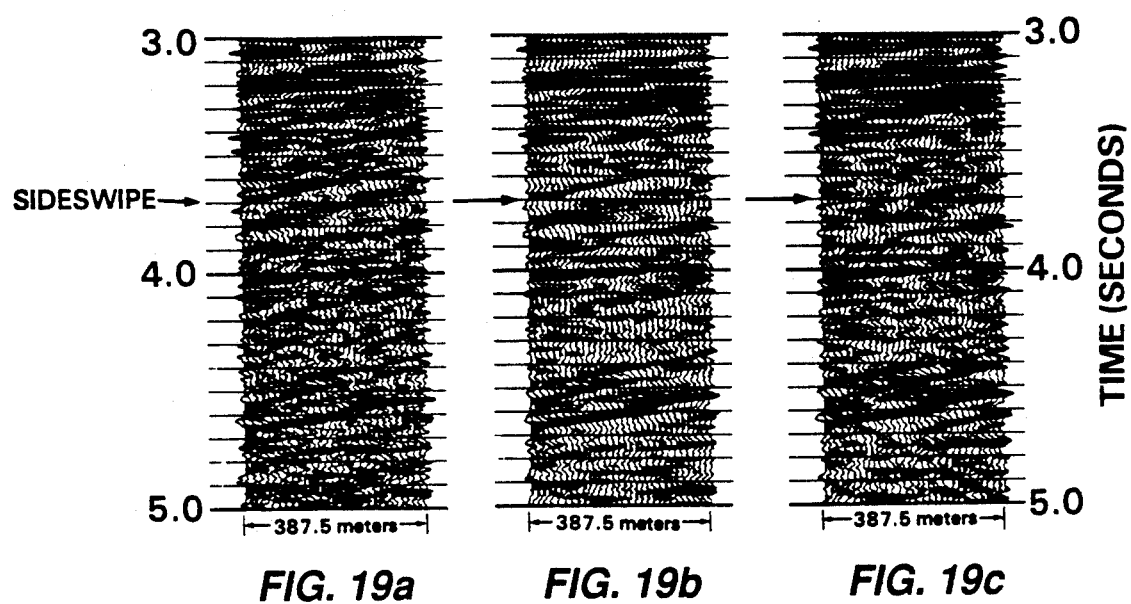
FIG. 19a is a plot of the center streamer data of the data shown in FIG. 18.
FIG. 19b is a plot showing the summation of the cross-line traces for the data shown in FIG. 18.
FIG. 19c shows the data of FIG. 18 processed by the method of this invention.

A comparison of the center streamer, cross-line sum and null steering as applied on the sorted stack data from FIG. 18 is shown in FIGS. 19a, b, and c. The strong repeating sawtoothed patterns in the event at 3.7 seconds on the center streamer (FIG. 19a) identifies it as sideswipe. This event was attenuated by the cross-line sum (FIG. 19b) but part of the leading and/or trailing edges of the sideswipe remained. However, the processing method of the present invention removed this event and appears to reveal an indicated flat lying event that was previously masked by the sideswipe (FIG. 19c).

Figure 20:
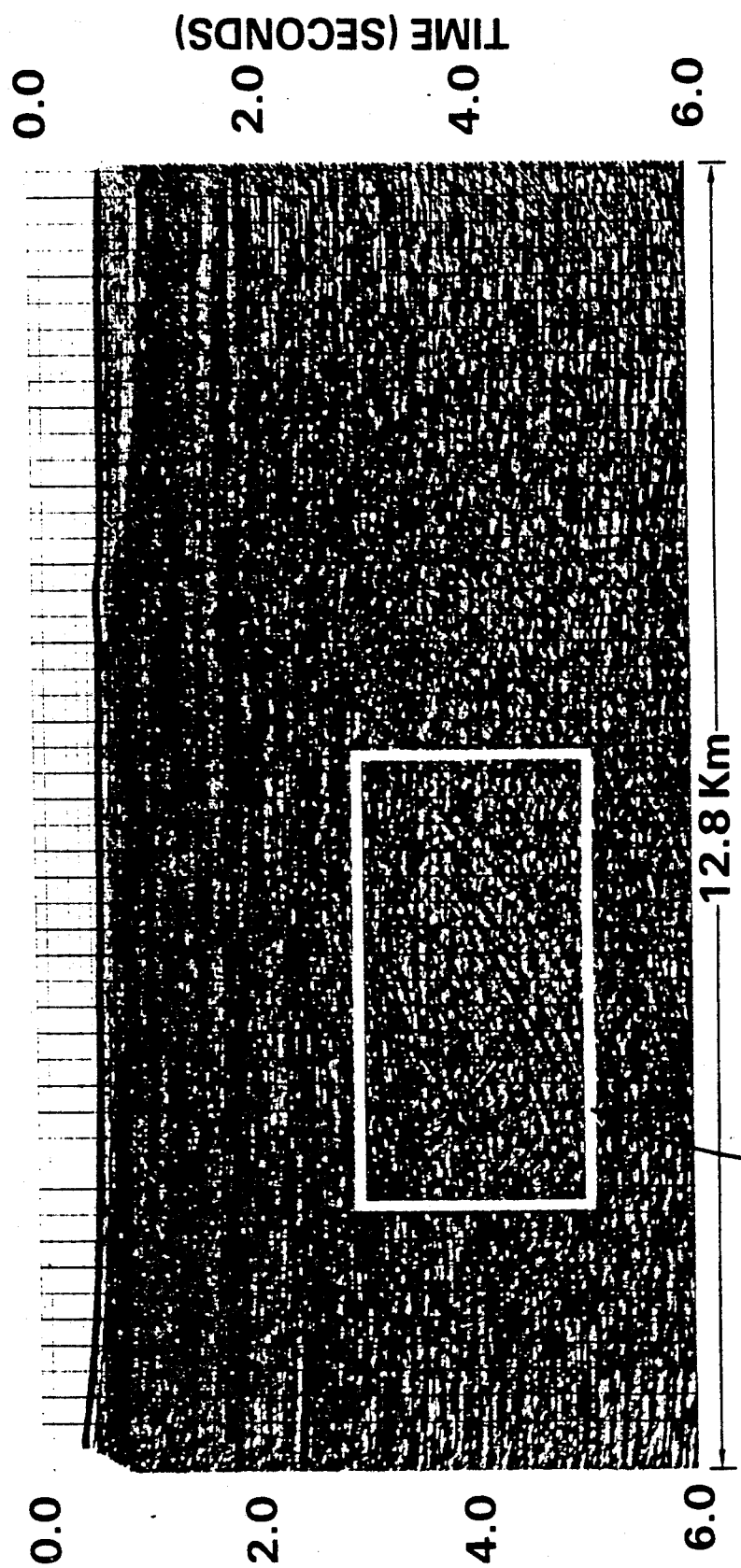
FIG. 20 is a plot of the center streamer data of the plot of FIG. 14 after deconvolution and migration.
Figure 21:
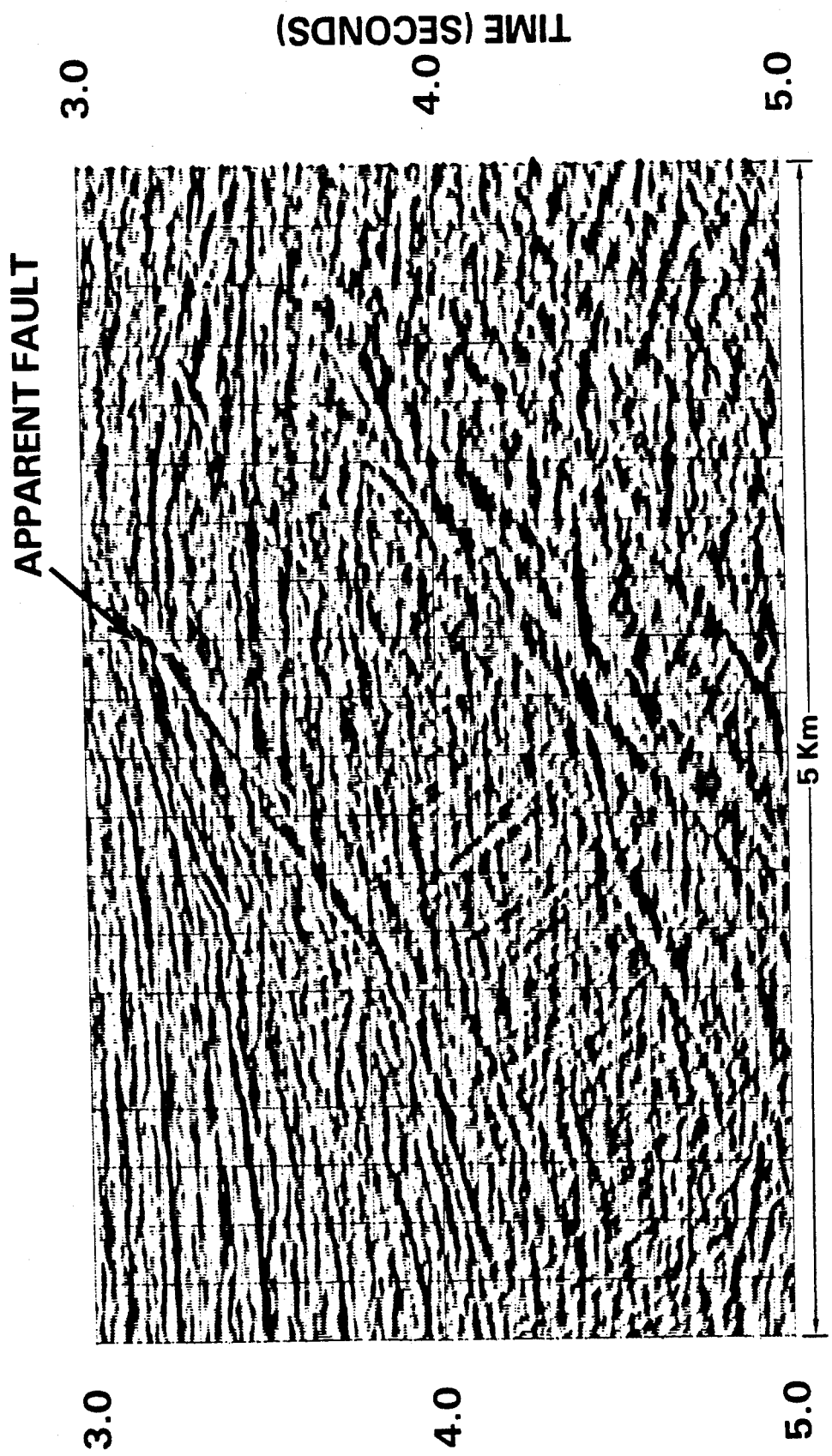
FIG. 21 is an enlarged plot of a portion of the data shown FIG. 20.

This example is even more dramatic when the processing method of the present invention is applied to the entire line. FIG. 20 is a plot of center streamer data of Line No. 1 after deconvolution and migration. An area outlined in the rectangle was a zone of interest for the prospect and an enlargement of this area is shown in FIG. 21. What appears to be a fault cutting through a crest of an anticline has been indicated. However, a review of the sorted stacked data, a portion of which is shown in FIG. 17, revealed repeating sawtoothed patterns indicating that the supposed fault was instead sideswipe.

Figure 22:
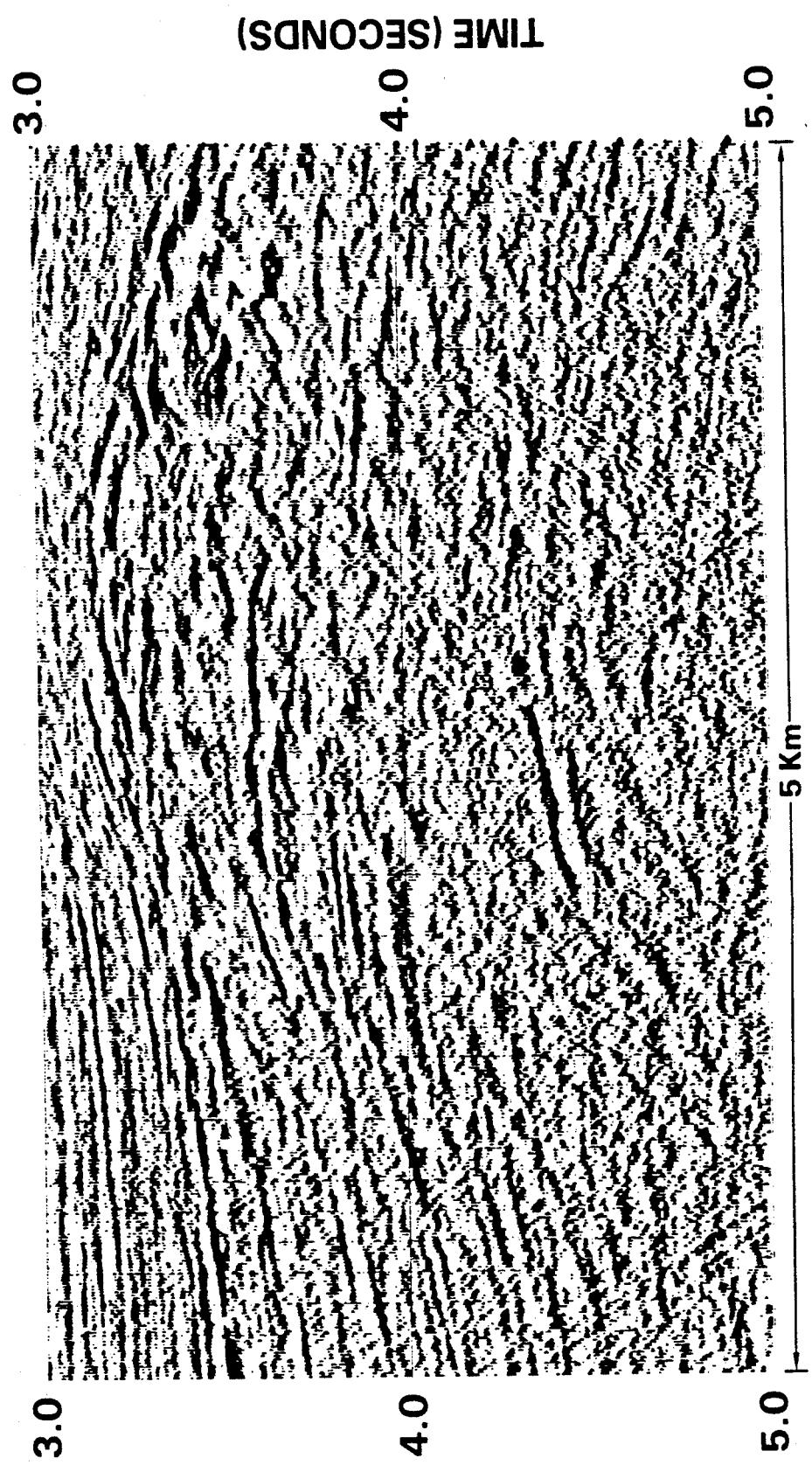
FIG. 22 is a plot of the data for the same zone of interest as in FIG. 21, after further processing.
Figure 23:
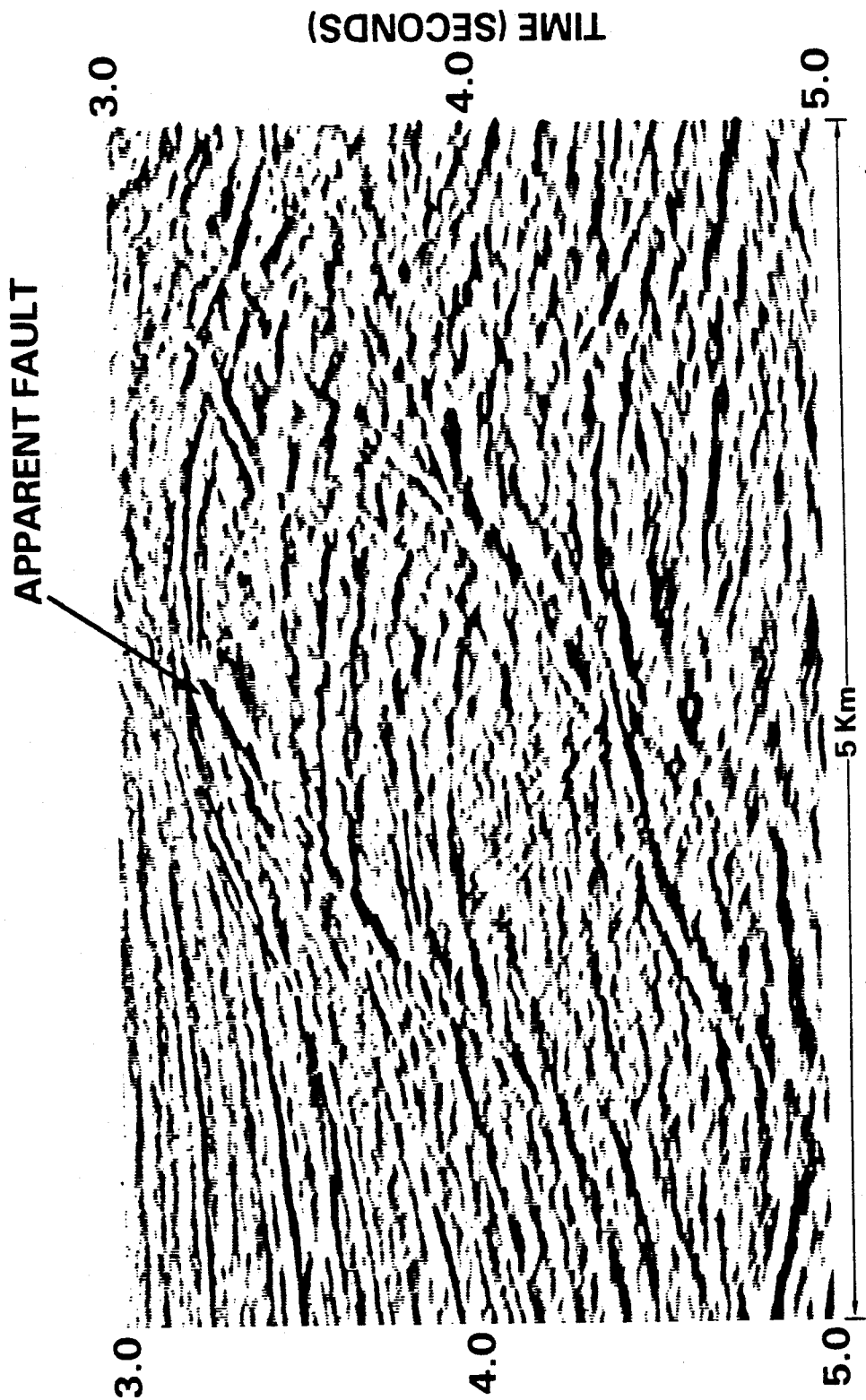
FIG. 23 is a plot of the data from the same zone of interest as in FIG. 21 after further processing.
Figure 24:
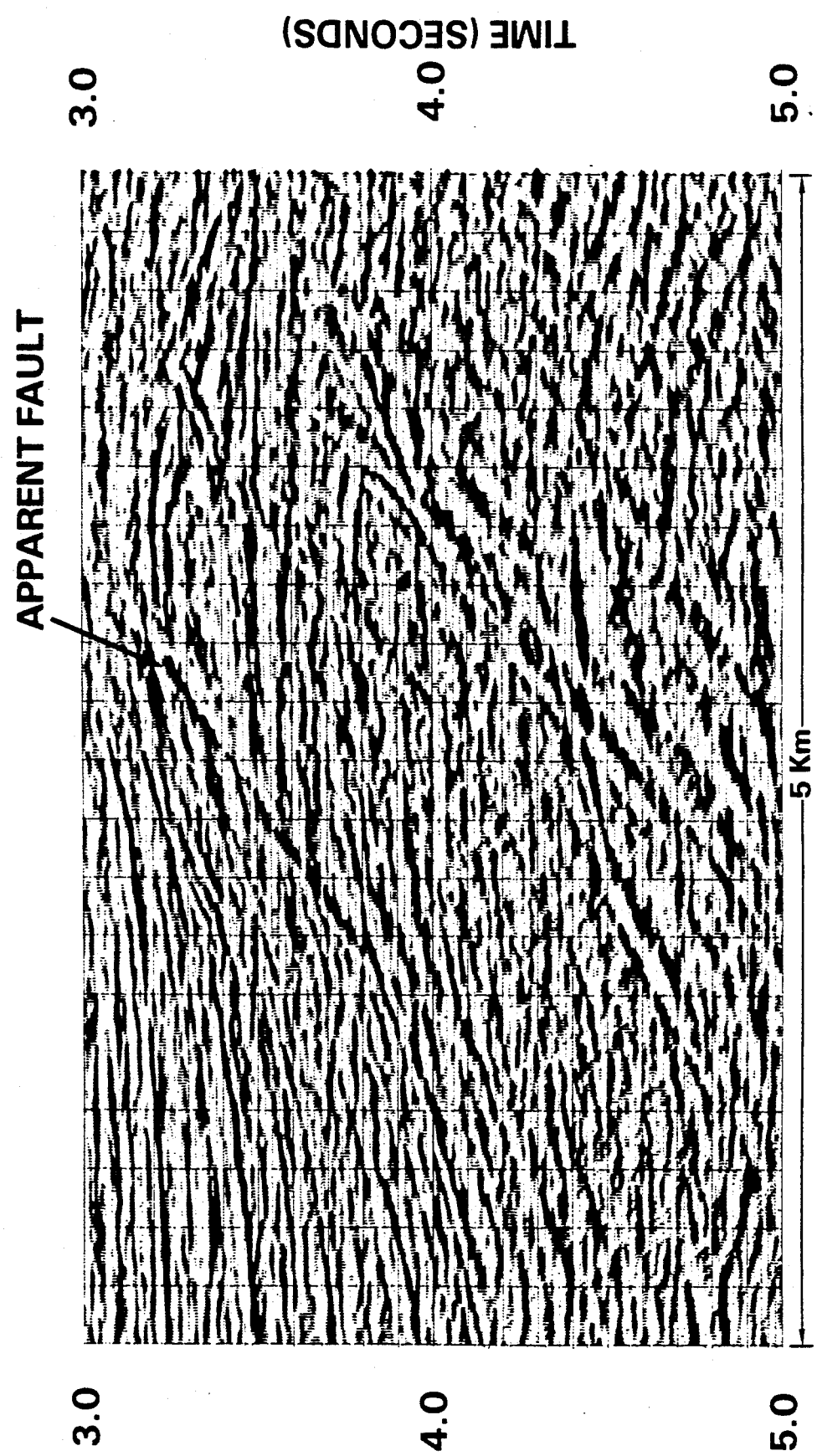
FIG. 24 is a plot of the data from the same zone of interest as in FIG. 21 after further processing.
Figure 25:
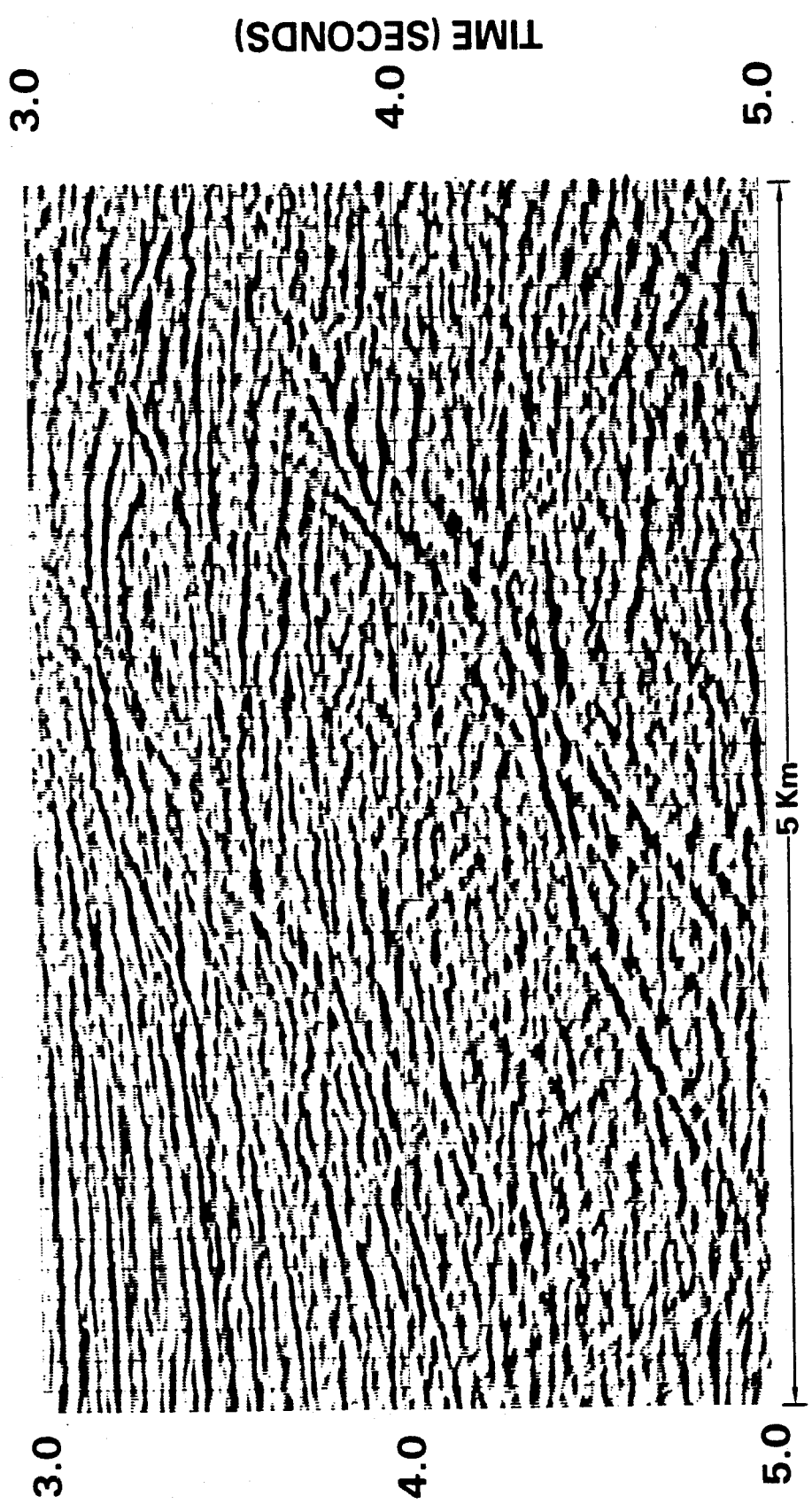
FIG. 25 is a plot of data from the same zone of interest as in FIG. 21, after processing by the method of this invention.

FIG. 22 is a plot of the same line but from the three dimensional survey after three dimensional migration. The difference to note between FIGS. 21 and 22 is the absence of the apparent fault in FIG. 22 that cuts the anticline in FIG. 21. The higher signal to noise ratio on FIG. 22 can be explained by a greater number of common depth points ("CDP") and longer offsets in the three dimensional data. Both the three dimensional stacked data with two dimensional migration (FIG. 23) and the cross-line sum with two dimensional migration (FIG. 24) show the apparent fault. The anticlinal feature in FIG. 25 is not faulted and is similar to the one in FIG. 21. Based on the fact that the fault does not appear on the three dimensional migrated data set, it is concluded that the apparent fault in the two dimensional data was due to sideswipe energy. Note that the section obtained using null steer processing of the present invention has significantly attenuated this sideswipe energy. It also has more clearly imaged the structure than the other two dimensional processed sections.

Test Line No. 2

The above examples show that sideswipe may appear as a fault on a conventional two dimensional data set. The example of Test Line No. 2 shows that sideswipe can also appear as a flat lying event.

Figure 26:
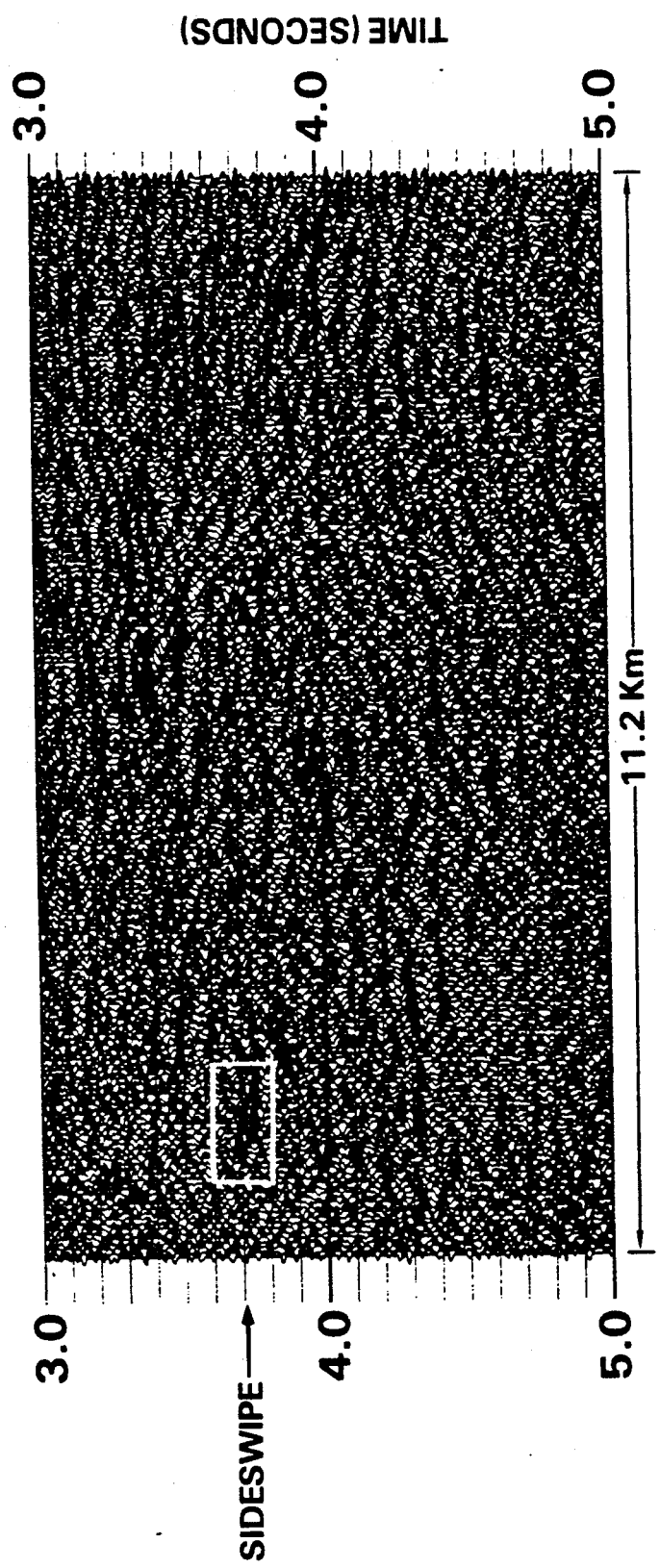
FIG. 26 is a plot of stacked center streamer data along another line of profile in the survey area of the data or FIGS. 13a and 13b.
Figure 27:
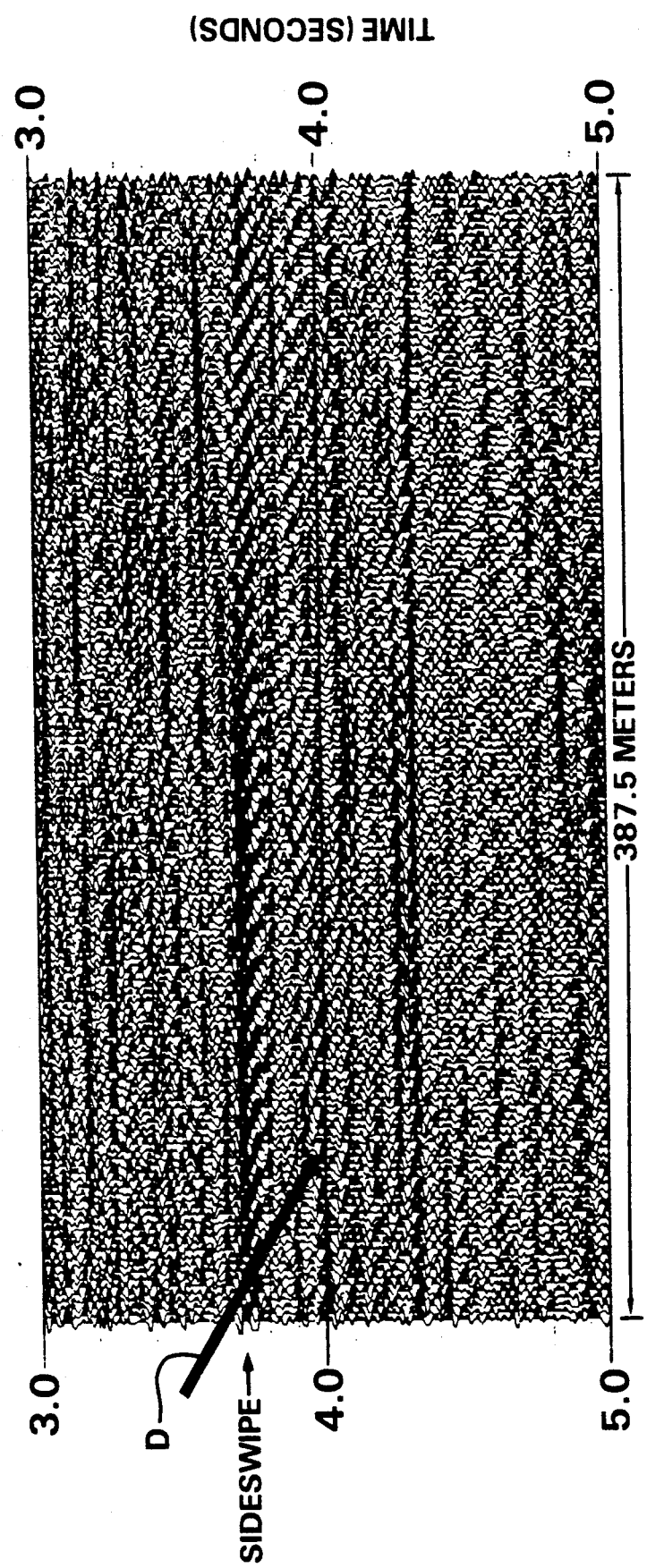
FIG. 27 is an enlarged plot of a portion of the data shown in FIG. 26.
Figure 28:
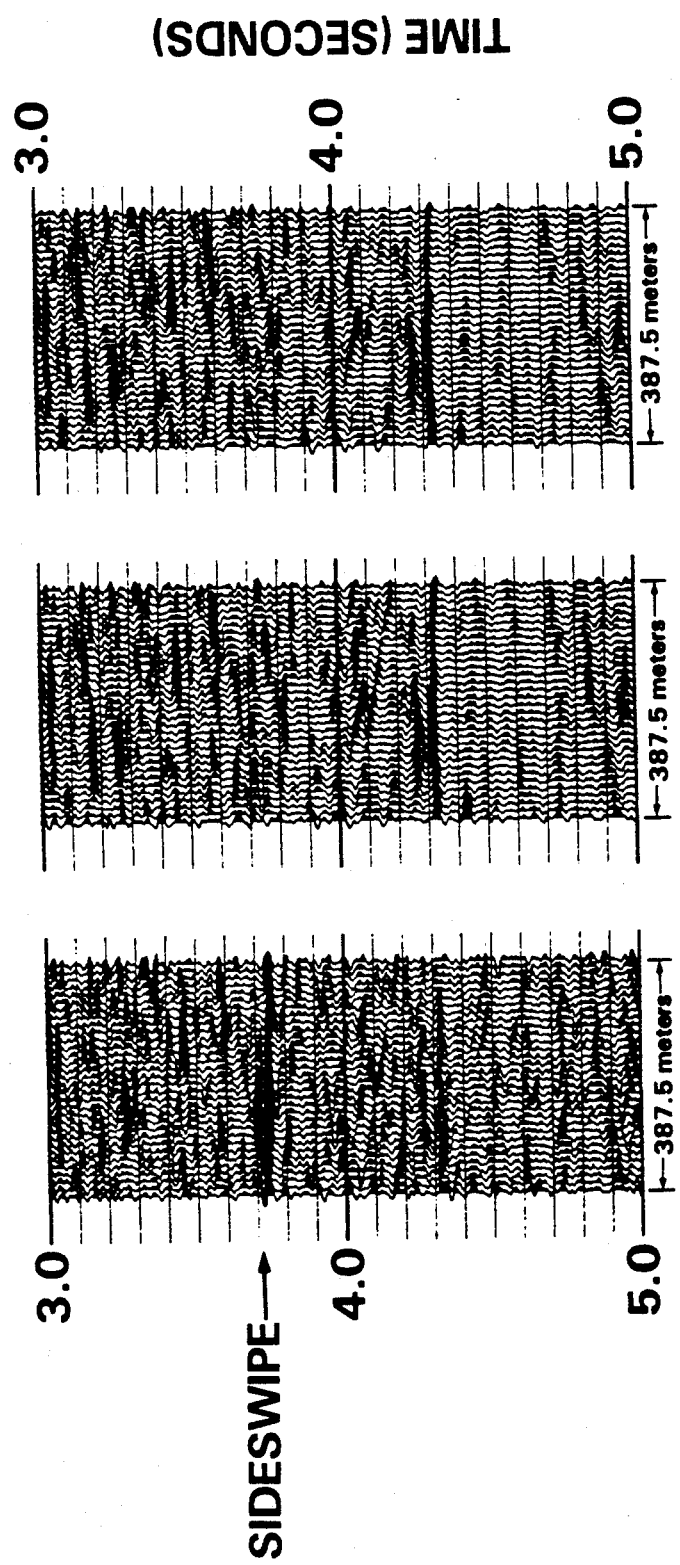
FIG. 28a is a plot of the center streamer data of the data shown in FIG. 27.
FIG. 28b is a plot showing the summation of the cross-line traces for the data shown in FIG. 27.
FIG. 28c is a plot showing the data of FIG. 27 processed by the method of this invention.
Figure 29:
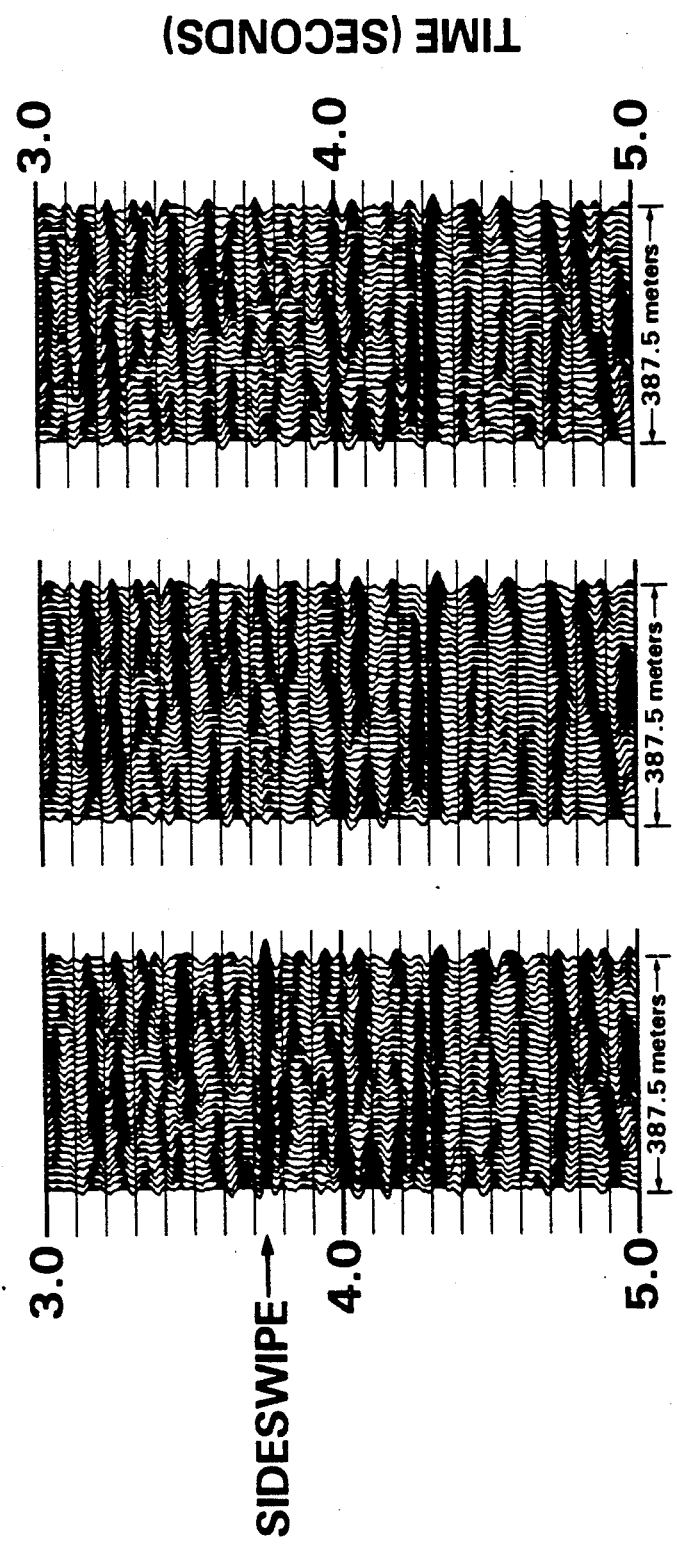
FIGS. 29a, 29b and 29c are plots of FIGS. 28a, 28b, and 28c, respectively, filtered with a 6-15 Hertz filter.

FIG. 26 is the center streamer stacked data (16 fold) from Test Line No. 2. The data on the left with poor signal to noise ratio corresponds with the portion of the line closest to the salt. Again, without crossline information, it is difficult to discern which events are coming from out of the two dimensional plane. The sorted stack display (FIG. 27) shows a flat sideswipe event at 3.7 seconds that has a time delay of approximately 13.7 ms/trace. Line D is drawn through one of the repeating sawtoothed patterns and is representative of out-of-plane energy. FIG. 28a is a plot of the center streamer data of the data shown in FIG. 27, and shows a very strong flat event at 3.7 seconds. FIG. 28b, a plot showing the summation of the cross-line traces at each offset for the data shown in FIG. 27, and FIG. 28c, a plot showing the data of FIG. 27 processed according to the present invention, look almost identical. FIGS. 29a, 29b, and 29c are plots of FIGS. 28a, 28b, and 28c, respectively, after application of a 6-15 HZ filter. These results show that at the low frequencies null steering method of the present invention attenuated more sideswipe than the cross-line summation.

F. Example 5

When the number of cross-line array elements is small and the angle of incident noise (null angle) is small, large weights are sometimes calculated for lower frequencies. The large filter weights can produce stability problems. With current technology the number of cross-line elements in marine seismic data ranges from one to five elements and cross-line spacings from 30 m to 100 m. This example addresses this stability problem and demonstrates a method for reducing the effect of instability at low frequencies.

Angles of incident noise that cause instability are generally defined as plus or minus 10-15 degrees (0-10 degrees is generally considered in the plane of the seismic line of profile). Generally weights are considered large when the absolute value of the amplitude is greater than about 2.0. These definitions were determined via experience with the method of the present invention.

This example illustrates how to correct for instability in a 4 element array with 50 m separation and nulls at plus and minus 14 degrees. In a plot of frequency versus dip the pattern from 0-10 hz would have an amplitude much greater than the main beam. These high amplitude sidelobes cause instability by amplifying low frequency noise. TABLE 1 is a table of the real and imaginary coefficients of the weights for the example processed as described earlier, and shows values much greater than 2.0 for the real coefficients.

When normalizing the weights to prevent the instability, it is important not to attenuate too many of the low frequencies to an extent that the signal in these frequencies could not be enhanced by a shaping deconvolution. This example shows how stabilizing the weights preserves most of the low frequencies and does not allow the weights to exceed 2.0.

For a complex number $x+yi$, this method of stabilizing the weights consists of adjusting the real portions of the weights by a factor $\Delta x$ so that the real parts of the weights are less than 2.0. This term must be the same for each complex conjugate pair but may be different from pair to pair. The phase angle of each weight is kept constant by adjusting the imaginary portions of the weights by a term $\Delta y$ such that $\Delta y = y^*(\Delta x)/x$. Finally, in order to keep the nulls in their specified directions, the amplitudes of the weights are scaled to maintain the same amplitude ratio between complex conjugate pairs as the original weights. In the case of 4 array elements only one pair is scaled to achieve the proper ratio. Table 1 also lists the real and imaginary values of the weights after going through this process. A list of the sums of these values before and after this process is shown in Table 2. Note that on the main beam that only frequencies below 10 hz are attenuated and that the amplitudes of the sidelobes are greatly reduced.

Figure 30:
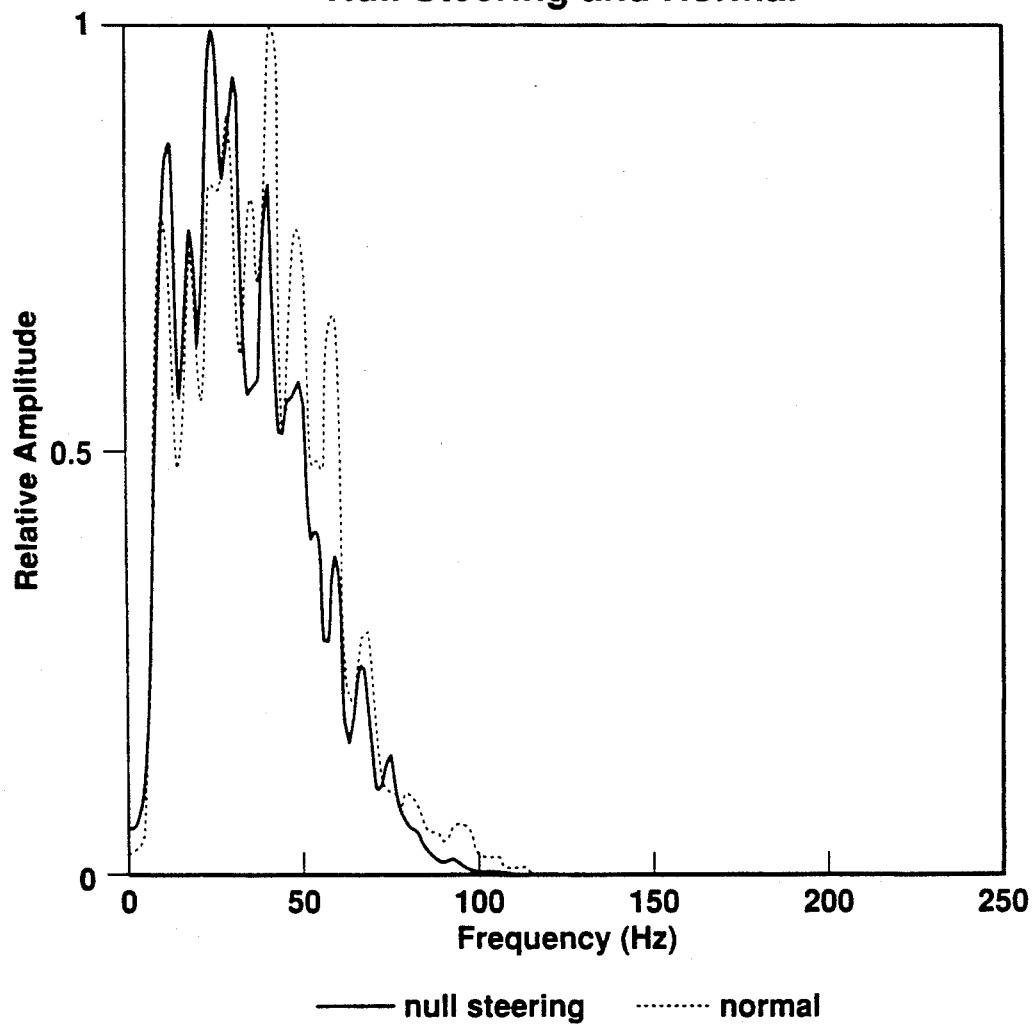
FIG. 30 is a plot comparing amplitude spectra for synthetic data before and after processing by the method of this invention.

The amplitude spectrum of 4 streamer marine data before and after application of the method of the present method is shown in FIG. 30. FIG. 30 demonstrates that the low frequencies not only have been preserved but have been increased in amplitude.

TABLE 1

| FREQ (hz) | ARRAY ELEMENT | ORIGINAL REAL WEIGHTS | ADJUSTED REAL WEIGHTS | ORIGINAL IMAG WEIGHTS | ADJUSTED IMAG WEIGHTS |
|---|---|---|---|---|---|
| 1.0 | 1 | 197.93 | 1.9346 | −0.39032E-10 | −0.38149E-12 |
| 1.0 | 4 | 197.93 | 1.9346 | −0.58551E-10 | −0.57227E-12 |
| 1.0 | 2 | −197.43 | −1.9297 | 0.46331E-12 | 0.47402E-10 |
| 1.0 | 3 | −197.43 | −1.9297 | 0.49046E-12 | 0.50180E-10 |
| 2.0 | 1 | 49.515 | 1.5149 | −0.29953E-11 | −0.91641E-13 |
| 2.0 | 4 | 49.515 | 1.5149 | −0.79632E-11 | −0.24364E-12 |
| 2.0 | 2 | −49.015 | −1.4996 | 0.15694E-12 | 0.51295E-11 |
| 2.0 | 3 | −49.015 | −1.4996 | 0.17834E-12 | 0.58290E-11 |
| 3.0 | 1 | 22.030 | 1.0298 | 0.35099E-12 | 0.16408E-13 |
| 3.0 | 4 | 22.030 | 1.0298 | −0.37017E-12 | −0.17304E-13 |
| 3.0 | 2 | −21.530 | −1.0064 | −0.18811E-14 | −0.40241E-13 |
| 3.0 | 3 | −21.530 | −1.0064 | 0.27777E-14 | 0.59421E-13 |
| 4.0 | 1 | 12.410 | 1.4101 | 0.00000 | 0.00000 |
| 4.0 | 4 | 12.410 | 1.4101 | 0.00000 | 0.00000 |
| 4.0 | 2 | −11.910 | −1.3532 | 0.00000 | 0.00000 |
| 4.0 | 3 | −11.910 | −1.3532 | 0.00000 | 0.00000 |
| 5.0 | 1 | 7.9575 | 1.9575 | −0.21180E-12 | −0.52101E-13 |
| 5.0 | 4 | 7.9575 | 1.9575 | −0.38208E-12 | −0.93990E-13 |
| 5.0 | 2 | −7.4575 | −1.8345 | 0.70327E-13 | 0.28589E-12 |
| 5.0 | 3 | −7.4575 | −1.8345 | 0.75764E-13 | 0.30799E-12 |
| 6.0 | 1 | 5.5389 | 1.5389 | 0.27532E-12 | 0.76493E-13 |
| 6.0 | 4 | 5.5389 | 1.5389 | 0.31445E-12 | 0.87364E-13 |
| 6.0 | 2 | −5.0389 | −1.4000 | −0.81255E-13 | −0.29246E-12 |
| 6.0 | 3 | −5.0389 | −1.4000 | −0.82602E-13 | −0.29731E-12 |
| 7.0 | 1 | 4.0806 | 1.0806 | 0.15475E-12 | 0.40979E-13 |
| 7.0 | 4 | 4.0806 | 1.0806 | 0.90462E-13 | 0.23955E-13 |
| 7.0 | 2 | −3.5806 | −0.94815 | −0.33463E-13 | −0.12637E-12 |
| 7.0 | 3 | −3.5806 | −0.94815 | −0.31471E-13 | −0.11885E-12 |
| 8.0 | 1 | 3.1341 | 1.1341 | 0.69793E-13 | −0.25255E-13 |
| 8.0 | 4 | 3.1341 | 1.1341 | 0.69793E-13 | 0.25255E-13 |
| 8.0 | 2 | −2.6341 | −0.95316 | −0.25255E-13 | −0.69793E-13 |
| 8.0 | 3 | −2.6341 | −0.95316 | −0.252553-13 | −0.69793E-13 |
| 9.0 | 1 | 2.4852 | 1.4852 | 0.00000 | 0.00000 |
| 9.0 | 4 | 2.4852 | 1.4852 | 0.00000 | 0.00000 |
| 9.0 | 2 | −1.9852 | −1.1864 | 0.00000 | 0.00000 |
| 9.0 | 3 | −1.9852 | −1.1864 | 0.00000 | 0.00000 |
| 10.0 | 1 | 2.0211 | 1.0211 | −0.70749E-14 | −0.35744E-14 |
| 10.0 | 4 | 2.0211 | 1.0211 | 0.38208E-14 | 0.19304E-14 |
| 10.0 | 2 | −1.5211 | −0.76851 | 0.10662E-14 | 0.21103E-14 |
| 10.0 | 3 | −1.5211 | −0.76851 | 0.57790E-15 | 0.11438E-14 |
| 11.0 | 1 | 1.6778 | 1.6778 | 0.20002E-13 | 0.20002E-13 |
| 11.0 | 4 | 1.6778 | 1.6778 | 0.20002E-13 | 0.20002E-13 |
| 11.0 | 2 | −1.1778 | −1.1778 | 0.20002E-13 | −0.20002E-13 |
| 11.0 | 3 | −1.1778 | −1.1778 | −0.20002E-13 | −1.20002E-13 |

TABLE 2

| FREQ (hz) | SUM OF ORIG REAL WEIGHTS | SUM OF NEW REAL WEIGHTS | SUM OF ORIG IMAG WEIGHTS | SUM OF NEW IMAG WEIGHTS |
| --- | --- | --- | --- | --- |
| 1.00 | 1.0000 | 0.97740E-02 | 0.20680E-24 | −0.244711E-12 |
| 2.00 | 1.0000 | 0.30595E-01 | 0.25849E-25 | −0.108367E-12 |
| 3.00 | 1.0000 | 0.46747E-01 | 0.12117E-26 | −0.424621E-15 |
| 4.00 | 1.0000 | 0.11362 | 0.00000 | 0.000000 |
| 5.00 | 1.0000 | 0.24600 | −0.16156E-26 | −0.300224E-13 |
| 6.00 | 1.0000 | 0.27783 | −0.16156E-26 | 0.422625E-13 |
| 7.00 | 1.0000 | 0.26481 | −0.16156E-26 | 0.251747E-13 |
| 8.00 | 1.0000 | 0.36185 | −0.40390E-27 | 0.169084E-13 |
| 9.00 | 1.0000 | 0.59762 | 0.00000 | 0.000000 |
| 10.00 | 1.0000 | 0.50523 | 0.63109E-29 | −0.529229E-15 |
| 11.00 | 1.0000 | 1.0000 | 0.10097E-27 | 0.100974E-27 |

The foregoing disclosure and description of the invention are illustrative and explanatory thereof, and various changes in the size, shape and materials, as well as in the details of the illustrated construction may be made without departing from the spirit of the invention.

We claim:

1. A method of removing the effects of unwanted out-of-plane energy contributions to seismic survey data along a seismic line of profile in a plane generally normal to the surface of the earth, comprising the steps of:
   (a) recording the seismic data collected from a seismic receiver geometry comprising receivers in-plane with the line of profile and receivers out-of-plane with the line of profile;
   (b) ordering the data in cross-line order in which seismic events along the line of profile are aligned in time and out-of-plane energy takes the form of a series of sawtoothed seismic events arriving at different times in the different lines of receivers; and
   (c) filtering the seismic data to remove the series of sawtoothed seismic events and thereby the effects of unwanted out-of-plane energy from the seismic data.

2. The method of claim 1 wherein the receivers are hydrophones, and the seismic receiver geometry comprises seismic streamers.

3. The method of claim 1 wherein the receivers are geophones, and the seismic receiver geometry comprises a land seismic survey.

4. The method of claim 1 wherein the receiver geometry is a rectangular array.

5. The method of claim 1, further including the step of:
   forming a display of cross-line sorted pre- or post stack seismic data so that sawtoothed events arriving at different times become evident.

6. The method of claim 1, further including the step of:
   forming a display of cross-line sorted pre- or post stack seismic data so that plural sawtoothed events arriving at different times become evident.

7. The method of claim 1, further including the step of:
   forming a display of cross-line sorted pre- or post stack seismic data so that the rate of change of arrival time between traces of sawtoothed events arriving at different times becomes evident.

8. The method of claim 1, wherein said step of filtering comprises the step of:
   null filtering the seismic data to remove the series of sawtoothed seismic events from the seismic survey data.

9. The method of claim 8, wherein said step of filtering comprises the step of:
   null filtering the seismic data to remove those sawtoothed events in the different lines of receivers.

10. The method of claim 8, further including the step of:
    adjusting the amplitude of lower frequencies during said step of null filtering.

11. A method of determining the dip of unwanted out-of-plane energy contributions to seismic survey data obtained in a seismic line of profile by at least one seismic receiver in response to a seismic source along the profile line in a plane generally normal to the surface of the earth, comprising the steps of:
    (a) recording the seismic data collected from a seismic receiver geometry comprising receivers in-plane with the line of profile and receivers out-of-plane with the line of profile;
    (b) ordering the data in cross-line order in which seismic events along the line of profile are aligned in time and out-of-plane energy takes the form of a series of sawtoothed seismic events arriving at different times in the different lines of receivers; and
    (c) forming a display of the common offset gathers or shot records so that out-of-plane energy, if present, may be identified by the presence of sawtoothed seismic events arriving at different times across the out-of-plane receivers.

* * * * *